(12) United States Patent
Mani et al.

(10) Patent No.: US 9,544,422 B2
(45) Date of Patent: *Jan. 10, 2017

(54) ACOUSTIC ECHO SUPPRESSION

(71) Applicant: Imagination Technologies Limited, Kings Langley (GB)

(72) Inventors: Senthil Kumar Mani, Hyderabad (IN); Gandhi Namani, Hyderabad (IN)

(73) Assignee: Imagination Technologies Limited, Kings Langley (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/797,419

(22) Filed: Jul. 13, 2015

(65) Prior Publication Data
US 2016/0014267 A1    Jan. 14, 2016

Related U.S. Application Data

(63) Continuation of application No. 14/579,416, filed on Dec. 22, 2014, now Pat. No. 9,112,951.

(30) Foreign Application Priority Data

Dec. 23, 2013 (GB) .................................. 1322926.5

(51) Int. Cl.
H04M 3/00 (2006.01)
H04M 9/08 (2006.01)
H04B 3/23 (2006.01)

(52) U.S. Cl.
CPC ............ H04M 3/002 (2013.01); H04M 9/082 (2013.01); H04B 3/237 (2013.01)

(58) Field of Classification Search
None
See application file for complete search history.

(56) References Cited

U.S. PATENT DOCUMENTS 6,125,179 A * 9/2000 Wu ...................... H04M 9/082
379/388.01
6,507,653 B1  1/2003 Romesburg
(Continued)

FOREIGN PATENT DOCUMENTS

WO    01/80439 A1    10/2001
WO  2012/158163 A1  11/2012

OTHER PUBLICATIONS

Haykin, S., "Adaptive Filter Theory", 3rd ed., Prentice-Hall, Englewood Cliffs, NJ, 1996.

(Continued)

Primary Examiner — Fan Tsang
Assistant Examiner — Jeffrey Lyte
(74) Attorney, Agent, or Firm — Vorys, Sater, Seymour and Pease LLP; Vincent M DeLuca

(57) ABSTRACT

A controller for an echo suppressor configured to suppress a residual echo of a far-end signal included in a primary error signal, the controller adapted for operation with a primary adaptive filter configured to form a primary echo estimate of the far-end signal included in a microphone signal and an echo canceller configured to cancel that primary echo estimate from the microphone signal so as to form the primary error signal, the controller comprising: a secondary adaptive filter configured to form a secondary echo estimate of the far-end signal comprised in the microphone signal; and control logic operable in at least two modes selected in dependence on a convergence state of the primary adaptive filter, the control logic being configured to control activation of the echo suppressor in dependence one or more transient or steady state decision parameters.

19 Claims, 10 Drawing Sheets

(56) References Cited

U.S. PATENT DOCUMENTS

| | | |
|---|---|---|
| 6,532,289 B1 | 3/2003 | Magid |
| 6,622,030 B1* | 9/2003 | Romesburg .............. H04B 3/23 |
| | | 379/406.01 |
| 2013/0251169 A1* | 9/2013 | Awano .................... H04R 3/02 |
| | | 381/66 |

OTHER PUBLICATIONS

Mani et al."Projection Based Near-end Speech Detectors for Time Domain Adaptive Echo Cancellation", International Journal of Recent Trends in Engineering, May 2009, vol. 1, No. 3.

Benesty et al. "A new class of doubletalk detectors based on cross-correlation", IEEE Trans. Speech Audio Process., vol. 8, No. 2, pp. 168-172, 2000.

ITU-T Recommendation G.164 (1988), Echo Suppressors.

ITU-T Recommendation G.168 (2012), Digital Network Echo Cancellers.

Ohta et al, "Acoustic Echo Cancellation using Sub-Adaptive Filter" Acoustics, Speech and Signal Processing, 2007. ICASSP Apr. 15-20, 2007, pp. I-85-I-88.

Jung et al.,"A new double-talk detector using echo path estimation", Acoustics, Speech, and Signal Processing (ICASSP), 2002 IEEE Int'l Conference, May 2002; pp. 1897-1900.

\* cited by examiner

ACOUSTIC ECHO SUPPRESSION

BACKGROUND OF THE INVENTION

This invention relates to a controller for an acoustic echo suppressor and a method of controlling an acoustic echo suppressor.

In telephony, an echo is a reflection of the voice signal. It is a delayed copy of the original. An example scenario is illustrated in FIG. 1, which shows a signal being captured by a far-end microphone and output by a near-end loudspeaker. The echo is a consequence of acoustic coupling between the loudspeaker and the near-end microphone; the near-end microphone captures the signal originating from its own loudspeaker in addition to the voice of the near-end speaker and any background noise. The result is an echo at the far-end loudspeaker. Echo cancellation is an important feature of telephony. Hands-free devices and teleconferencing, in particular, require echo cancellation that can adapt to environments having a wide range of acoustic characteristics.

Echo cancellers typically synthesise an estimate of the echo from the far-end voice signal. The estimated echo is then subtracted from the microphone signal. This technique requires adaptive signal processing to generate a signal accurate enough to cancel the echo effectively. An adaptive filter is often used to model the environment's acoustic impulse response.

An acoustic echo canceller and adaptive filter are described in International Patent Application WO 2012/158163, incorporated by reference herein in its entirety. The acoustic echo canceller described therein uses a non-linear processor operating in the frequency domain to determine suppression factors for each of a plurality of frequency bands. The echo canceller uses the suppression factors to control the removal of echo from a near-end audio signal. However, even though the echo canceller works reasonably well in high echo return loss scenarios, it suffers from poor performance during low echo return loss scenarios (i.e. high ratios of echo to near-end signal). Additionally, the computational cost of coherence measures between signals in the frequency domain is high.

Even with high performance adaptive filters it is not always possible for an echo canceller to remove all echoes from a signal, and the echo cancelled signal from an echo canceller will often include residual echo of the far-end voice signal. This is because the echo estimate generated by an adaptive filter will not always precisely match the true echo in the microphone signal. There can be several reasons for this, including loss of convergence of the adaptive filter due to changes in echo path and as a result of freezing the adaptive filter during near-end speech to avoid wide divergence of the filter.

In order to address the problem of residual echo in a microphone signal following echo cancellation, an echo suppressor can be used to remove the residual echo by replacing or masking the microphone signal when residual echo is present. To ensure that an echo suppressor is enabled only at appropriate moments, echo suppressors are typically controlled according to the presence of near-end speech. This is with the aim of avoiding the introduction of artifacts into the microphone signal or otherwise interfering with near-end speech carried in the microphone signal. U.S. Pat. Nos. 6,507,653 and 6,532,289 describe detectors for identifying near-end speech and controlling an echo suppressor according to whether or not near-end speech is identified. However, using conventional near-end speech detectors to control an echo suppressor can lead to clipping of double talk during periods of high echo relative to the near-end speech present in a microphone signal.

BRIEF SUMMARY OF THE INVENTION

According to a first aspect of the present invention there is provided a controller for an echo suppressor configured to suppress a residual echo of a far-end signal included in a primary error signal, the controller adapted for operation with a primary adaptive filter configured to form a primary echo estimate of the far-end signal included in a microphone signal and an echo canceller configured to cancel that primary echo estimate from the microphone signal so as to form the primary error signal, the controller comprising:
  a secondary adaptive filter configured to form a secondary echo estimate of the far-end signal comprised in the microphone signal, the length of the primary adaptive filter being greater than the length of the secondary adaptive filter;
  a coherence estimator configured to form a first measure of coherence between the microphone signal and the primary error signal, and a second measure of coherence between the microphone signal and the primary echo estimate; and
  control logic operable in at least two modes selected in dependence on a convergence state of the primary adaptive filter, the control logic being configured to:
    in its first mode selected when the primary adaptive filter is in a non-converged state, combine the microphone signal and the secondary echo estimate so as to form a transient decision parameter indicative of a state of the microphone signal and, in dependence on the transient decision parameter, control activation of the echo suppressor; and
    in its second mode selected when the primary adaptive filter is in a converged state, combine the first and second measures of coherence so as to form one or more first steady state decision parameters indicative of a state of the microphone signal and, in dependence on said one or more first steady state decision parameters, control activation of the echo suppressor.

In embodiments of the invention, machine readable code can be provided for generating the controller. In embodiments of the invention, a machine readable storage medium having encoded thereon non-transitory machine readable code can be provided for generating the controller.

The echo suppressor may be configured to, when activated, replace the primary error signal with generated noise having characteristics selected to substantially match background noise comprised in the microphone signal.

The transient decision parameter may be indicative of the presence of echo of the far-end signal in the microphone signal.

The control logic may be configured to, in its first mode, cause activation of the echo suppressor when the transient decision parameter indicates that echo of the far-end signal is present in the microphone signal but near-end speech is not present.

The control logic may be configured to, in its first mode, determine that the transient decision parameter indicates that echo but not near-end speech is present in the microphone signal when the transient decision parameter is above a predefined threshold.

The control logic may be configured to, in its first mode, combine the microphone signal and the secondary echo estimate such that the transient decision parameter represents a measure of angle between a vector expression of the microphone signal and a vector expression of the secondary echo estimate, said vector expressions each being a sequence of samples of the respective microphone or secondary echo estimate.

(A) The secondary adaptive filter may be configured to form the secondary echo estimate from the far-end signal and adapted in dependence on a second error signal generated by means of a comparison of its secondary echo estimate and the microphone signal.

The secondary adaptive filter may be configured to receive the far-end signal by means of a delay line arranged to delay the far-end signal by a number of samples commensurate with a measure of the time delay between the far-end signal and its echo in the microphone signal.

(B) The secondary adaptive filter may be configured to form the secondary echo estimate from the primary echo estimate and adapted in dependence on a secondary error signal generated by means of a comparison of its secondary echo estimate and the microphone signal.

The coherence estimator may be further configured to form a third measure of coherence of the microphone signal with itself, and the control logic may be configured to, in its first mode, combine the microphone signal and the secondary echo estimate in dependence on the third measure of coherence.

The third measure of coherence may be a measure of autocorrelation or energy of the microphone signal.

The controller may comprise both a first secondary adaptive filters configured in accordance with paragraph (A) and a second secondary adaptive filters configured in accordance with paragraph (B), the control logic being configured to, in its first mode, form respective first and second transient decision parameters and control activation of the echo suppressor in dependence on both the first and second transient decision parameters.

The one or more first steady state decision parameters may be indicative of the presence of near-end speech.

The control logic may be configured to, in its second mode, cause activation of the echo suppressor when the one or more first steady state decision parameters indicate that near-end speech is not present.

The control logic may be configured to, in its second mode, determine that the one or more first steady state decision parameters indicate that near-end speech is not present when the or more first steady state decision parameters are above a first predetermined threshold.

The first measure of coherence may be a measure of cross correlation between the microphone signal and the primary error signal, and the second measure of coherence may be a measure of cross correlation between the microphone signal and the primary echo estimate.

The control logic may be configured to, in its second mode, combine the first and second measures of coherence so as to form a first one of the one or more first steady state decision parameters proportional to a difference between the first and second measures of coherence, said difference being scaled by a measure of the magnitude of the microphone signal.

The control logic may be configured to, in its second mode, combine the first and second measures of coherence so as to form a second one of the one or more first steady state decision parameters proportional to a difference between the first and second measures of coherence, said difference being scaled by a sum of the first and second measures of coherence.

The coherence estimator may be further configured to form a third measure of coherence of the microphone signal with itself, and the control logic being configured to, in its second mode, combine the first and third measures of coherence so as to form a second steady state decision parameter indicative of a state of the microphone signal and to control activation of the echo suppressor further in dependence on the second steady state decision parameter.

The control logic may be configured to combine the first and third measures of coherence such that the second steady state decision parameter is proportional to a ratio of the first and third measures of coherence.

The coherence estimator being further configured to form a fourth measure of coherence of the primary error signal with itself, and the control logic being configured to, in its second mode, combine the third and fourth measures of coherence so as to form a third steady state decision parameter indicative of a state of the microphone signal and to control activation of the echo suppressor further in dependence on the third steady state decision parameter.

The control logic may be configured to combine the third and fourth measures of coherence such that the third steady state decision parameter is proportional to a ratio of the third and fourth measures of coherence.

The third measure of coherence may be a measure of autocorrelation or energy of the microphone signal, and the fourth measure of coherence may be a measure of autocorrelation or energy of the primary error signal.

The second and third steady state decision parameters are indicative of the presence of near-end speech.

The control logic may be configured to, in its second mode, cause activation of the echo suppressor when the second and/or third steady state decision parameters indicate that near-end speech is not present.

The control logic may be configured to, in its second mode, determine that the second and/or third steady state decision parameters indicate that near-end speech is not present when the second steady state decision parameter is below a second predetermined threshold and/or the third steady state decision parameter is above a third predetermined threshold.

The controller may further comprise a convergence discriminator configured to identify the convergence state of the primary adaptive filter in dependence on one or more measures of an expected time required for the primary adaptive filter to converge to a predetermined level of convergence.

The convergence discriminator may be further configured to identify the convergence state of the primary adaptive filter in dependence on one or more of the steady state decision parameters.

The lengths of the primary and secondary adaptive filters may be represented by the number of coefficients of the respective adaptive filter or represented by the length of time corresponding to the number of samples over which the respective adaptive filter concurrently operates.

The secondary adaptive filter may be configured to operate at a lower sampling rate than the primary adaptive filter.

According to a second aspect of the present invention there is provided a method for controlling an echo suppressor configured to suppress a residual echo of a far-end signal included in a primary error signal received from an echo canceller, the echo canceller being configured to cancel a primary echo estimate from a microphone signal so as to form the primary error signal, the primary echo estimate being formed at a primary adaptive filter and representing an estimate of the far-end signal comprised in the microphone signal, the method comprising:

at a secondary adaptive filter, forming a secondary echo estimate of the far-end signal comprised in the microphone signal, the length of the primary adaptive filter being greater than the length of the secondary adaptive filter;

forming a first measure of coherence between the microphone signal and the primary error signal, and a second measure of coherence between the microphone signal and the primary echo estimate;

determining a convergence state of the primary adaptive filter; and selecting in dependence on the determined convergence state:

a transient decision path if the primary adaptive filter is determined to be in a non-converged state, the transient decision path combining the microphone signal and the secondary echo estimate so as to form a transient decision parameter indicative of a state of the microphone signal;

a steady state decision path if the primary adaptive filter is determined to be in a converged state, the steady state decision path combining the first and second measures of coherence so as to form one or more first steady state decision parameters indicative of a state of the microphone signal; and controlling activation of the echo suppressor in dependence on said transient or one or more first steady state decision parameters.

In embodiments of the invention, machine readable code can be provided for implementing the method of switching encode configurations at an encoder pipeline. In embodiments of the invention, a machine readable storage medium having encoded thereon non-transitory machine readable code can be provided for implementing the method of switching encode configurations at an encoder pipeline.

The method may comprise, on the transient decision path, combining the microphone signal and the secondary echo estimate such that the transient decision parameter represents a measure of angle between a vector expression of the microphone signal and a vector expression of the secondary echo estimate, said vector expressions each being a sequence of samples of the respective microphone or secondary echo estimate.

The step of forming a secondary echo estimate may comprise:

at the secondary adaptive filter, forming the secondary echo estimate from the far-end signal; and adapting the secondary adaptive filter in dependence on a second error signal generated by means of a comparison of its secondary echo estimate and the microphone signal.

The step of forming a secondary echo estimate may comprise:

at the secondary adaptive filter, forming the secondary echo estimate from the primary echo estimate; and adapting the secondary adaptive filter in dependence on a secondary error signal generated by means of a comparison of its secondary echo estimate and the microphone signal.

The step of forming a secondary echo estimate may comprise forming a first secondary echo estimate at a first secondary adaptive filter configured in accordance with paragraph (A) and forming a second secondary echo estimate at a second secondary adaptive filter configured in accordance with paragraph (B); and the method may comprise:

on the transient decision path, forming respective first and second transient decision parameters; and controlling activation of the echo suppressor in dependence on both the first and second transient decision parameters.

The first measure of coherence may be a measure of cross correlation between the microphone signal and the primary error signal, and the second measure of coherence may be a measure of cross correlation between the microphone signal and the primary echo estimate.

The method may comprise, on the steady state decision path, combining the first and second measures of coherence so as to form a first one of the one or more first steady state decision parameters proportional to a difference between the first and second measures of coherence, said difference being scaled by a measure of the magnitude of the microphone signal.

The method may comprise, on the steady state decision path, combining the first and second measures of coherence so as to form a second one of the one or more first steady state decision parameters proportional to a difference between the first and second measures of coherence, said difference being scaled by a sum of the first and second measures of coherence.

The method may further comprise:

forming a third measure of coherence of the microphone signal with itself;

on the steady state decision path, combining the first and third measures of coherence so as to form a second steady state decision parameter indicative of a state of the microphone signal; and controlling activation of the echo suppressor further in dependence on the second steady state decision parameter.

The step of combining the first and third measures of coherence may be performed such that the second steady state decision parameter is proportional to a ratio of the first and third measures of coherence.

The method may further comprise:

forming a fourth measure of coherence of the primary error signal with itself;

on the steady state decision path, combining the third and fourth measures of coherence so as to form a third steady state decision parameter indicative of a state of the microphone signal; and controlling activation of the echo suppressor further in dependence on the third steady state decision parameter.

The step of combining the third and fourth measures of coherence may be performed such that the third steady state decision parameter is proportional to a ratio of the third and fourth measures of coherence.

The third measure of coherence may be a measure of autocorrelation or energy of the microphone signal, and the fourth measure of coherence may be a measure of autocorrelation or energy of the primary error signal.

The step of determining a convergence state of the primary adaptive filter may be performed in dependence on one or more measures of an expected time required for the primary adaptive filter to converge to a predetermined level of convergence.

The step of determining a convergence state of the primary adaptive filter may be performed further in dependence on one or more of the steady state decision parameters.

BRIEF DESCRIPTION OF THE DRAWINGS

The present invention will now be described by way of example with reference to the accompanying drawings. In the drawings.

DETAILED DESCRIPTION

The following description is presented by way of example to enable any person skilled in the art to make and use the invention. The present invention is not limited to the embodiments described herein and various modifications to the disclosed embodiments will be readily apparent to those skilled in the art.

There is a need for an improved controller for an acoustic echo suppressor and an improved method of controlling an acoustic echo suppressor.

A controller for an acoustic echo suppressor is provided for operation with an acoustic echo canceller and primary adaptive filter. The controller may control the echo suppressor in accordance with the output of a decision path selected in dependence on the convergence state of the adaptive filter. The decision paths can be used to determine when the suppressor is to be activated in dependence on decision parameters formed for each decision path. The controller may include a secondary adaptive filter for forming a secondary echo estimate of a far-end signal in the microphone signal on which the canceller and suppressor operate. In the examples described herein the secondary adaptive filter is a short adaptive filter.

Figure 1:
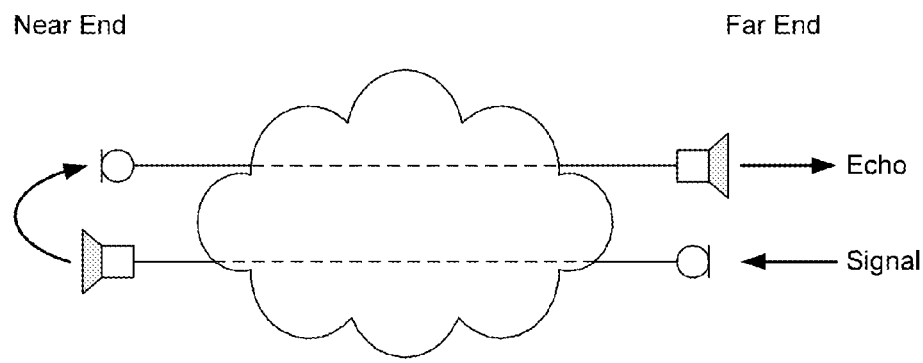
FIG. 1 shows an example of near-end and far-end in telephony.
Figure 2:
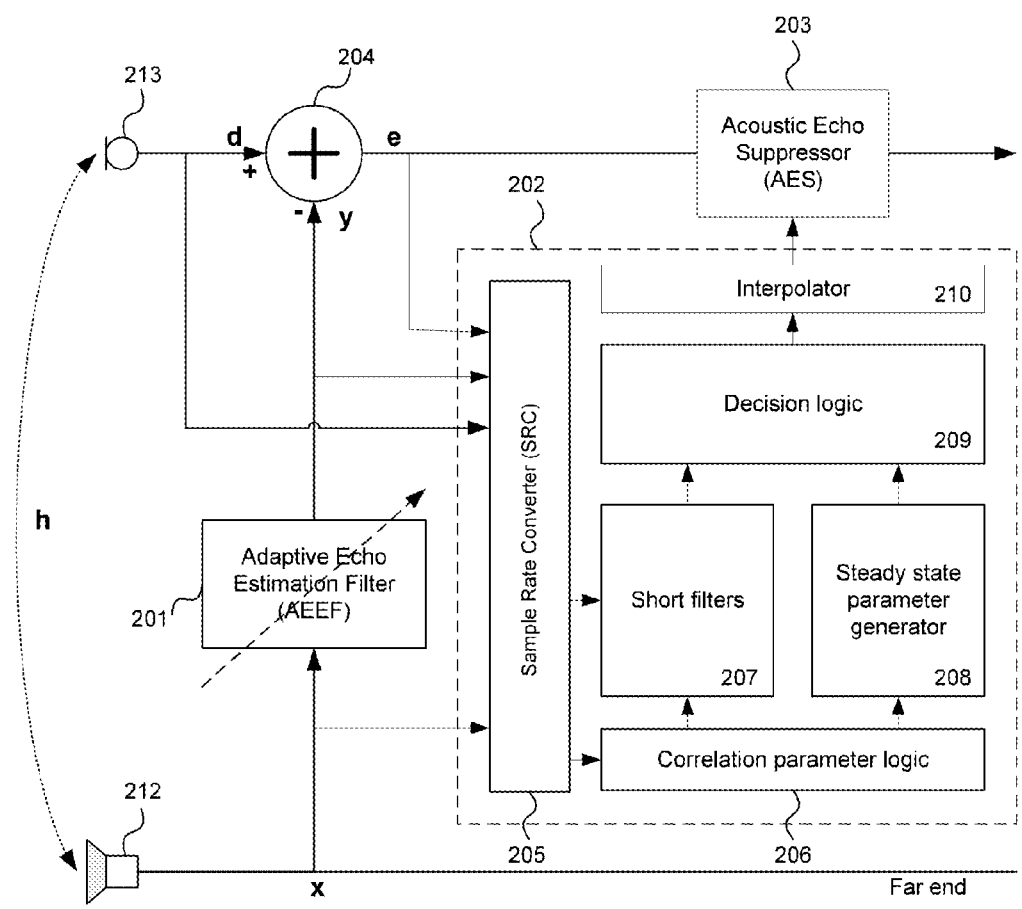
FIG. 2 is a schematic diagram of a controller for an acoustic echo suppressor.

FIG. 2 shows an example of a controller 202 for an acoustic echo suppressor (AES) 203. The controller and other components shown in FIG. 2 could, for example, be provided at a communication device (e.g. a VoIP handset) operable to communicate with another such communication device in the manner discussed with respect to FIG. 1. The controller receives a far-end signal x, a microphone signal d, an estimated echo signal y, and an error signal e representing the difference between the microphone signal and the estimated echo signal and output by echo canceller 204. The microphone signal is captured by microphone 213 and will typically capture echo of the far-end signal x output by loudspeaker 212. The echo is a delayed version of far-end signal x filtered by the acoustic environment, represented by impulse response h.

Also shown in FIG. 2 is an Adaptive Echo Estimation Filter (AEEF) 201 configured to estimate the acoustic echo y received at the microphone 213 from speaker 212 and provide that estimated echo to the echo canceller 204. The acoustic echo represents leakage from the system's loudspeaker to its microphone. This is predominantly the acoustic impulse response of the room, but it may also incorporate elements relating to the hardware and software in the audio driver interface and other devices in the audio path. The AEEF 201 uses the estimated impulse response $\hat{h}$ to generate the estimate of the echo signal $\hat{y}$, which is removed from the audio signal d captured by the microphone. AEEF 201 could be any suitable adaptive filter for forming an estimate of the acoustic echo between speaker and microphone.

Controller 202 can be configured to control the acoustic echo suppressor 203 in dependence on the far-end signal x, microphone signal d, estimated echo signal $\hat{y}$, and error signal e that it receives. This is achieved by means of two decision paths embodied at the controller and selected in dependence on whether the AEEF 201 is deemed to have converged. The decision paths include a transient state decision path which is selected when the AEEF has not converged, and a steady state decision path which is selected when the AEEF has converged. Each of the decision paths is adapted for controlling activation of the echo suppressor 203 in dependence on a state of the microphone signal.

For example, the microphone signal may be assigned one of three different states:
STATE 1: Far-end speech alone and background noise (single talk)
STATE 2: Near-end speech with background noise or background noise alone
STATE 3: Both far-end and near-end speech with background noise (double talk)

In the examples described herein the decision paths of the controller can be configured to identify periods of residual echo in the microphone that do not include near-end speech and on which echo suppression should be performed. The controller can be referred to as a non-linear processor or NLP since output from the controller is not a linear function of its signal inputs and instead derived by means of decisions taken in accordance with one or more algorithms.

In many situations where the near-end signal contains significant signal energy that is independent of any echo this will be due to talking at the near-end. This situation is conveniently denoted "near-end speech" herein. The signal energy might, of course, be due to a different sound source. This is particularly true during teleconferencing or hands-free operation. Therefore, the term "near-end speech" is used to refer to any significant signal energy in the near-end signal that is not due to an echo. It should also be understood that the term "near-end speech" is largely synonymous with the term "double-talk".

Typically the AEEF is constantly adapted only when near-end speech is not present (e.g. in STATE 1), with adaptation of the AEEF being frozen during the presence of near-end speech (e.g. in STATE 2 and STATE 3) in order to avoid divergence of the filter.

The echo estimate ŷ formed by the AEEF 201 is provided to echo canceller 204, which subtracts the echo estimate from the microphone signal so as to generate an error signal e. Under steady state conditions when the AEEF is converged and the echo path between speaker and microphone is steady and well-defined, the echo estimate is likely to be accurate and the error signal will therefore contain very little, if any, echo of the far-end signal. However, under other conditions, there can be a considerable residual echo present in the error signal which has not been cancelled by echo canceller 204. This could be because, for example, the AEEF has not converged or an echo path change has occurred. At appropriate times, an acoustic echo suppressor 203 can be employed to suppress such residual echoes. For example, the echo suppressor can be configured to replace the error signal with synthetic noise generated so as to match the—characteristics of the ambient background noise received at the microphone. Such noise can be termed "comfort noise". Alternatively, the echo suppressor could attenuate the error signal across all or a subset of frequency bands.

The echo suppressor 203 is activated by controller 202, which can be configured to identify regions of residual echo in the error signal that do not include near-end voice and which are suitable to be replaced with synthetic noise. In this manner, a receiver of the error signal (such as a far-end communication device) can be provided with an echo-free acoustic signal from the microphone. In the embodiments of the controller described herein, the echo suppressor is either activated (performing echo suppression) or not activated (not performing echo suppression). However, in other embodiments of the controller, the degree of activation of the echo suppressor could be controlled by the controller—for example, with the AES 203 being controlled to blend synthetic noise with the error signal so as to mask but not replace residual echo.

It can be advantageous to provide the controller with a sample rate converter (SRC) 205 so as to allow the controller to operate at a lower sampling rate than the audio signals with respect to which the controller performs its analysis. This enables the controller to consume fewer resources of the system at which it is implemented. For example, the controller could be configured to operate at a sample rate of 8 kHz, with the microphone signal, far-end signal, error signal and echo estimate having sample rates of 16 kHz or 24 kHz or 32 kHz or 48 kHz (all the audio signals would typically have the same sample rate, but they could be different). If sample rate down conversion is performed, an interpolator 210 can be provided at the controller so as to upconvert the control signal from decision logic 209 back to the appropriate sample rate for the error signal on which the AES 203 operates.

The controller 202 controls the activation of the echo suppressor by means of decision parameters selected according to whether the AEEF is deemed to have converged. Thus, a first set of one or more decision parameters are used in the case that the AEEF has not converged, and a second set of one or more decision parameters are used in the case that the AEEF has converged. Examples of the calculation and use of such decision parameters at the controller will now be described.

Firstly, it is useful to consider the echo path impulse response vector h between speaker and microphone, which can be modelled as:

$$h = [h_0 \; h_1 \; h_2 \ldots h_{N-1}]^T \quad (1)$$

Where N is the length of the echo path, sampled at same sampling instance as microphone signal d and far-end or reference input signal x.

Let y(n) be the actual acoustic echo, s(n) be the near-end signal and v(n) be the ambient background noise at discrete time instant n. The microphone signal can be written as the sum of the actual echo, the near-end signal and the ambient background noise.

$$d(n) = y(n) + s(n) + v(n) \quad (2)$$

Similar to h, the far-end or reference signal vector x and microphone signal vector d are given by:

$$x = [x(n) \; x(n-1) \; x(n-2) \ldots x(n-(N-1))]^T \quad (3)$$

$$d = [d(n) \; d(n-1) \; d(n-2) \ldots d(n-(L-1))]^T \quad (4)$$

Where L represents frame length or block length. Its value should not be greater than N.

The actual echo y(n) and the estimated echo ŷ(n) output by the adaptive filter are given by the true echo path h and the estimated echo path ĥ.

$$y(n) = h^T x \quad (5)$$

$$\hat{y}(n) = \hat{h}^T x \quad (6)$$

The error signal e(n) in the acoustic echo cancellation process is given by:

$$e(n) = d(n) - \hat{y}(n) \quad (7)$$

This error signal is often used for adapting the adaptive filter. Commonly this adaptation is achieved using a Normalized Least Mean Square (NLMS) algorithm with a fixed or adaptive step size μ:

$$\hat{h}(n+1) = \hat{h}(n) + 2\mu \frac{e(n)x(n)}{\|x\|^2} \quad (8)$$

The data processing system may operate on each sample in the time domain or on blocks of samples in the time domain. It may also operate on blocks of samples in the frequency domain or on individual samples in a combination of the time and frequency domains.

In the case of time domain sample-based processing, the acoustic echo estimate ŷ(n) and error signal e(n) for each discrete instant are estimated using corresponding far-end sample x(n) and microphone signal d(n). In the case of block-processing, the adaptive filter will operate on each block of the far-end signal. To generalize the implementation to be either sample-based or block-based, vector representations can be used for the far end data buffer x used by the adaptive filter given by (3), current block of far-end data to be processed $x_1$ the echo estimate ŷ, error e and microphone signal d. These vectors can be given as:

$$x_1 = [x(n) \; x(n-1) \; x(n-2) \ldots x(n-(L-1))]^T \quad (9)$$

$$\hat{y} = [\hat{y}(n) \; \hat{y}(n-1) \; \hat{y}(n-2) \ldots \hat{y}(n-(L-1))]^T \quad (10)$$

$$d = [d(n) \; d(n-1) \; d(n-2) \ldots d(n-(L-1))]^T \quad (11)$$

$$e = [e(n) \; e(n-1) \; e(n-2) \ldots e(n-(L-1))]^T \quad (12)$$

In sample based processing, each sample x(n) in x is fed to a far-end data buffer for use as an input to the AEEF and the oldest sample is removed. For block based processing, a chunk of data of length L is fed to the far-end data buffer allocated to x and the oldest samples of length L are removed.

The error signal from the adaptive filter will often include a residual echo that is not cancelled by the echo estimate generated by the filter. This can be due to the filter not being converged and hence the echo estimate being inaccurate, as well as due to echo path changes that occur whilst the filter is frozen (e.g. because near-end speech has been detected). Such a residual echo is generally unimportant during near-end speech and double talk (STATE 2 and STATE 3 above) because human perception is such that a residual echo is not noticeable to a person who is talking. However, when there is only far end speech and background noise in the microphone signal, the residual echo after AEEF cancellation can be significant and dominate over any residual background noise in the error signal. This can be particularly true once the error signal has been amplified at a far-end receiving device arranged to receive the processed output from the near-end microphone. The role of the AES 203 is to suppress such residual echoes in the error signal.

Estimation of Correlation Parameters

In the present example, four correlation parameters are calculated from which decision parameters can be formed. The correlation parameters are formed at correlation parameter logic 206 of the controller 202.

1. Cross Correlation $r_{de}$ Between the Microphone Signal and the Error Signal The cross correlation $r_{de}$ between microphone signal d and error signal e is given by $$r_{de}(n)=E[de^T] \quad (13)$$

Since the error signal e is the difference between microphone output d and the echo estimate $\hat{y}$, $r_{de}$ be given as.

$$r_{de}(n)=E[(d)(d-\hat{y})^T] \quad (14)$$

After substituting microphone signal as given in equation (2), $r_{de}$ can be arrived as given below, where s is the near-end signal without any background noise or echo, and v is the ambient background noise in the microphone signal.

$$r_{de}(n)=E[(y+s+v)(y+s+v-\hat{y})^T] \quad (15)$$

From (4) and (5), substituting actual echo and the echo estimate in the equation (15)

$$r_{de}(n) = E\left[(h^T x + s + v)\left(h^T x + s + v + \hat{h}^T x\right)^T\right] \quad (16)$$

$$r_{de}(n) = E\begin{bmatrix} \left( h^T x x^T h + sy^T + vy^T + ss^T + \right) \\ vv^T - s\hat{y}^T - v\hat{y}^T - h^T x x^T \hat{h} + \\ ys^T + yv^T + sv^T + vs^T \end{bmatrix} \quad (17)$$

According to independent theory, near end speech and background noise is assumed to be un-correlated to the echo signal. Hence, their cross correlation is assumed to be zero. So, equation (17) can be reduced as given below $$r_{de}(n)=E[(h^T x x^T h+ss^T+vv^T-h^T x x^T \hat{h})] \quad (18)$$

Taking the auto-correlation of the far-end signal as $R_{xx}$ we can write (18) as:

$$r_{de}(n)=h^T R_{xx} h+\sigma_s^2+\sigma_v^2 -h^T R_{xx}\hat{h} \quad (19)$$

Where $\sigma_s^2$ is the variance of the near-end signal and $\sigma_v^2$ is the variance of the ambient background noise.

2. Cross Correlation $r_{d\hat{y}}$ Between the Microphone Signal and the Echo Estimate The cross correlation $r_{d\hat{y}}$ between the microphone signal d and the echo estimate $\hat{y}$ is given by $$r_{d\hat{y}}(n)=E[d\hat{y}^T] \quad (20)$$

Substituting microphone signal and echo estimate from (2) and (5), we get $$r_{d\hat{y}}(n)=E[(y+s+v)(\hat{y})^T] \quad (21)$$

$$r_{d\hat{y}}(n)=E[(h^T x+s+v)(\hat{h}^T x)^T] \quad (22)$$

Based on the independent theory, assuming echo is uncorrelated to the near end and background noise $$r_{d\hat{y}}(n)=E[h^T x x^T \hat{h}] \quad (23)$$

$$r_{d\hat{y}}(n)=h^T R_{xx}\hat{h} \quad (24)$$

3. Auto-Correlation or Energy of the Microphone Signal

The auto correlation or energy of the microphone signal $R_{dd}$ is given by $$R_{dd}(n)=\|d^2\|=[dd^T] \quad (25)$$

$$\|d^2\|=E[(y+s+v)(y+s+v)^T] \quad (26)$$

$$\|d^2\|=E[(h^T x x^T h+ss^T+vv^T)] \quad (27)$$

$$R_{dd}(n)=\|d^2\|=h^T R_{xx} h+\sigma_s^2+\sigma_v^2 \quad (28)$$

4. Auto-Correlation or Energy of the Error Signal

The auto correlation or energy of the error $R_{ee}$ is given by $$R_{ee}(n) = E[(d - \hat{y})(d - \hat{y})^T] \quad (29)$$

$$R_{ee}(n) = E[(y + s + v - \hat{y})(y + s + v - \hat{y})^T] \quad (30)$$

$$R_{ee}(n) = E\left[\left(h^T x + s + v - \hat{h}^T x\right)\left(h^T x + s + v - \hat{h}^T x\right)^T\right] \quad (31)$$

$$R_{ee}(n) = E\left[\left(h^T x + s + v - \hat{h}^T x\right)\left(x^T h + s^T + v^T - x^T \hat{h}\right)\right] \quad (32)$$

$$R_{ee} = E\begin{bmatrix} h^T x x^T h + h^T x s^T + h^T x v^T - h^T x x^T \hat{h} + \\ sx^T h + ss^T + sv^T - sx^T \hat{h} + \\ vv^T + vs^T + vx^T h - vx^T \hat{h} - \\ \hat{h}^T x x^T h - \hat{h}^T x s^T - \hat{h}^T x v^T + \hat{h}^T x x^T \hat{h} \end{bmatrix} \quad (33)$$

Applying independent theory, assuming echo is uncorrelated to the near end and background noise, the auto correlation of the error signal is given by $$R_{ee}(n)=h^T R_{xx} h+\sigma_s^2+\sigma_v^2-h^T R_{xx}\hat{h}-\hat{h}^T R_{xx} h+\hat{h}^T R_{xx}\hat{h} \quad (34)$$

The correlation operations and energy estimates used to form the correlation parameters of the present example are measures of coherence between the respective signals. For example, a cross correlation between the microphone and error signals is a measure of coherence between the microphone and error signals. In other examples, other measures of coherence could be used that are not mathematical correlations.

Steady State Decision Parameters

The correlation parameters can be used by the controller 202 to calculate steady state decision parameters for use in the steady state decision path of the controller. One or more of the following decision parameters can be calculated at the steady state parameter generator 208 of the controller. The following decision parameters exhibit high dynamic range allowing the controller to respond to near-end speech and identify regions of residual echo in microphone signals that do not contain near-end speech. This enables the controller to achieve seamless full duplex performance under wide-ranging signal conditions.

1. Decision Parameter 1 (DP1)

The decision parameter 1, $\zeta_{HS_1}$ or DP1 is in the present example defined as $$\xi_{HS_1}(n) = \frac{r_{d\hat{y}}(n) - r_{de}(n)}{\|d^2(n)\|} \tag{35}$$

$$\xi_{HS_1}(n) = \frac{2h^T R_{xx}\hat{h} - h^T R_{xx}h - \sigma_{s^2} - \sigma_{v^2}}{h^T R_{xx}h + \sigma_{s^2} + \sigma_{v^2}} \tag{36}$$

Assuming that during steady state condition, the estimated echo path is nearly equal to the actual echo path. The above equation can be simplified as $$\xi_{HS_1}(n) = \frac{h^T R_{xx}h - \sigma_{s^2} - \sigma_{v^2}}{h^T R_{xx}h + \sigma_{s^2} + \sigma_{v^2}} \tag{37}$$

During far-end single talk $\sigma_s^2$ and $\sigma_v^2$ becomes zero and the parameter value is close to +1. During near-end speech $R_{xx}$ becomes zero and the parameter is close to −1. DP1 can be said to be indicative of the presence of near-end speech.

2. Decision Parameter 2 (DP2)

The decision parameter 2, $\zeta_{HS_2}$ or DP2 is in the present example defined as $$\xi_{HS_2}(n) = \frac{r_{d\hat{y}}(n) - r_{de}(n)}{r_{d\hat{y}}(n) + r_{de}(n)} \tag{38}$$

$$= \frac{h^T R_{xx}\hat{h} - [h^T R_{xx}h + \sigma_{s^2} + \sigma_{v^2} - h^T R_{xx}\hat{h}]}{h^T R_{xx}\hat{h} + [h^T R_{xx}h + \sigma_{s^2} + \sigma_{v^2} - h^T R_{xx}\hat{h}]} \tag{39}$$

$$= \frac{2h^T R_{xx}\hat{h} - h^T R_{xx}h - \sigma_{s^2} - \sigma_{v^2}}{h^T R_{xx}h + \sigma_{s^2} + \sigma_{v^2}} \tag{40}$$

At steady state, since the echo estimate is equal to the actual echo, we have $$\xi_{HS_2}(n) = \frac{h^T R_{xx}h - \sigma_{s^2} - \sigma_{v^2}}{h^T R_{xx}h + \sigma_{s^2} + \sigma_{v^2}} \tag{41}$$

During far-end single talk $\sigma_s^2$ and $\sigma_v^2$ becomes zero and the parameter value is close to +1. During near-end speech $R_{xx}$ becomes zero and the parameter is close to −1. DP2 can be said to be indicative of the presence of near-end speech.

3. Decision Parameter 3 (DP3)

The decision parameter 3, $\zeta_{HS_3}$ or DP3 is in the present example defined as $$\xi_{HS_3}(n) = \frac{r_{de}(n)}{R_{dd}(n)} \tag{42}$$

DP3 is a measure of the proportion of the microphone signal present in the primary error signal e, and hence of the presence of near-end speech. From (19) and (28) we have $$\xi_{HS_3}(n) = \frac{h^T R_{xx}h + \sigma_{s^2} + \sigma_{v^2} - h^T R_{xx}\hat{h}}{h^T R_{xx}h + \sigma_{s^2} + \sigma_{v^2}} \tag{43}$$

At steady state, the echo estimate is equal to the actual echo, so we have $$\xi_{HS_3}(n) = \frac{\sigma_{s^2} + \sigma_{v^2}}{h^T R_{xx}h + \sigma_{s^2} + \sigma_{v^2}} \tag{44}$$

DP3 parameter value during farend single talk is close to 0, during near-end the value is +1 and during double talk regions it is close to +1.

4. Decision Parameter 4 (DP4)

The decision parameter 4, $\zeta_{HS_4}$ or DP4 is in the present example defined as $$\xi_{HS_4}(n) = \frac{R_{ee}(n)}{R_{dd}(n)} \tag{45}$$

DP4 is indicative of the size of the error signal, and hence of the presence of near-end speech. Substituting equations (28) and (34) into (45), we have $$\xi_{HS_4}(n) = \frac{h^T R_{xx}h + \sigma_{s^2} + \sigma_{v^2} - h^T R_{xx}\hat{h} - \hat{h}^T R_{xx}h + \hat{h}^T R_{xx}\hat{h}}{h^T R_{xx}h + \sigma_{s^2} + \sigma_{v^2}} \tag{46}$$

At steady state, since the echo estimate is equal to the actual echo, we have $$\xi_{HS_4}(n) = \frac{\sigma_{s^2} + \sigma_{v^2}}{h^T R_{xx}h + \sigma_{s^2} + \sigma_{v^2}} \tag{47}$$

DP4 parameter value during far-end single talk is close to 0, during near-end the value is +1 and during double talk regions it is close to +1.

5. Decision Parameter 5 (DP5)

The decision parameter 5, $\zeta_{HS_5}$ or DP5 is given by $$\xi_{HS_5}(n) = \frac{\xi_{HS_4}(n)}{\xi_{HS_3}(n)} = \frac{R_{ee}(n)}{r_{de}(n)} \tag{48}$$

Since decision parameter 5 is a ratio between decision parameters 4 and 3, the fifth decision parameter may or may not be considered to be a decision parameter in its own right. DP5 parameter value during far-end single talk is close to 0, during near-end the value is +1 and during double talk regions it is close to +1.

The use of the steady state decision parameters by the controller is described below.

Transient Decision Parameters

The controller also forms one or more transient decision parameters for use in the transient decision path of the controller. In the present example, the transient decision parameters are calculated through scaling by the third correlation parameter representing an auto-correlation or energy of the microphone signal. In other examples, the controller could form the transient decision parameters in dependence on other correlation parameters (or other measures of coherence), or without dependence on any of the correlation parameters.

Controller 202 comprises short filters 207 for generating the transient decision parameters. The short filters are shown in more detail in FIG. 4. In the present example a short filter is provided for determining each transient decision parameter, but in other examples multiple transient decision parameters could be determined using a single filter or multiple filters could be used in the determination of a single decision parameter.

1. Transient Decision Parameter 1 (TDP1)

A first transient decision parameter is formed at a first short filter arrangement 401 by a first short adaptive filter 404 arranged to generate an echo estimate $y_1$ from a delay compensated far-end signal x' used as its reference input. The far-end signal x is delayed by delay line 403 by a number of samples D, which represents the delay between the source of the echo in the far-end signal and the echo in the microphone signal. The short filter echo estimate $y_1$ is subtracted at canceller 405 from the microphone signal d and the resultant error signal $e_1$ is used to continuously adapt the filter.

The first transient decision parameter in this example is defined as the angle between the vector expressions of the echo estimate $y_1$ and microphone signal d. In regions of the microphone signal that—comprise near-end speech and/or ambient background noise but no echo of the far-end signal, this first transient decision parameter is zero. TDP-1 can be said to be indicative of the presence of echo in the microphone signal. Thus, the first transient decision parameter (TDP1) is given by $$\zeta_{HS1}(n) = \frac{E[y_1.d^T]}{R_{dd}(n)} = \frac{E\left[\left(\hat{h}_1^T x'\right)(y+s+v)^T\right]}{R_{dd}(n)} \quad (49)$$

$$= \frac{E\left[\left(\hat{h}_1^T x'\right)(h^T x + s + v)^T\right]}{R_{dd}(n)} \quad (50)$$

$$= \frac{E\left[\left(\hat{h}_1^T x'\right)(x^T h + s^T + v^T)\right]}{R_{dd}(n)} \quad (51)$$

$$= \frac{E\left[\hat{h}_1^T x' x^T h + \hat{h}_1^T x' s^T + \hat{h}_1^T x' v^T\right]}{R_{dd}(n)} \quad (52)$$

Applying independent theory and assuming echo is uncorrelated to the near end signal and background noise, the equation (52) can be reduced as below $$\zeta_{HS1}(n) = \frac{\hat{h}_1^T R_{x'x} h}{h^T R_{xx} h + \sigma_{s^2} + \sigma_{v^2}} \quad (53)$$

2. Transient Decision Parameter 2 (TDP2)

A second transient decision parameter is formed at a second short filter arrangement 402 by a second short adaptive filter 406 arranged to generate an echo estimate $y_2$ from the echo estimate y generated by the AEEF, which is used as reference input to the short filter. The short filter echo estimate $y_2$ is subtracted at canceller 407 from the microphone signal d and the resultant error signal $e_2$ is used to continuously adapt the filter. In this manner, the second filter is arranged to refine the echo estimate generated by the AEEF. The refined echo estimate is expected to have a high correlation with the microphone signal during regions of the microphone signal that do not include near-end speech—e.g. single talk regions in which the microphone signal comprises background noise and echo alone.

The second transient decision parameter is in this example defined as the angle between vector expressions of the microphone signal d and the refined echo estimate $y_2$. In regions of the microphone signal that—comprise near-end speech and/or ambient background noise but no echo of the far-end signal, this second transient decision parameter is zero. TDP2 can be said to be indicative of the presence of echo in the microphone signal. Thus, the second transient decision parameter (TDP2) is given by:

$$\zeta_{HS2}(n) = \frac{E[y_2.d^T]}{R_{dd}(n)} = \frac{E\left[\left(\hat{h}_2^T y\right)(y+s+v)^T\right]}{R_{dd}(n)} \quad (54)$$

$$= \frac{E\left[\left(\hat{h}_2^T \left(\hat{h}^T x\right)\right)(h^T x + s + v)^T\right]}{R_{dd}(n)} \quad (55)$$

$$= \frac{E\left[\left(\hat{h}_2^T \left(\hat{h}^T x\right)\right)(x^T h + s^T + v^T)\right]}{R_{dd}(n)} \quad (56)$$

$$= \frac{E\left[\hat{h}_2^T \left(\hat{h}^T xx^T h + \hat{h}^T xs^T + \hat{h}^T xv^T\right)\right]}{R_{dd}(n)} \quad (57)$$

Applying independent theory and assuming echo is uncorrelated to the near end signal and background noise, the equation (57) can be reduced to $$\zeta_{HS2}(n) = \frac{\hat{h}_2^T \hat{h}^T R_{xx} h}{h^T R_{xx} h + \sigma_{s^2} + \sigma_{v^2}} \quad (58)$$

The first and second short adaptive filters 401 and 402 are shorter than the AEEF and operate with a smaller number of filter coefficients that the AEEF. Due to the action of the sample rate converter 205, the short adaptive filters also operate on signals of a lower sampling frequency. It is in general advantageous if secondary adaptive filters used to generate transient decision parameters are shorter than the primary adaptive filter which generates the primary echo estimate used to cancel echo in the microphone signal. It is further advantageous if the secondary filters operate at a lower sampling rate (e.g. due to downsampling of the signals received by the secondary filters, or the selective input of samples into the secondary filters). This allows the controller to respond more quickly to changes in the state of the microphone signal, as a result of quicker convergence with fewer computations than would be required by a longer filter. This is to be traded-off against filter accuracy which tends to demand a longer filter. Typically, it can be said that a shorter adaptive filter operates on each given sample in dependence on fewer previous samples. The first and second short adaptive filters may or may not be of the same length.

The length of an adaptive filter can be considered to be, for example, the number of samples over which the filter operates, the length of time over which the filter operates (e.g. the length of time represented by the number of samples over which the filter concurrently operates), and the number of coefficients of the filter (typically equal to the number of samples over which the filter operates). It will be appreciated that other metrics can be used to define the length of a filter, as appropriate to that particular adaptive filter.

In the example shown in FIG. 2, it has been found that a short filter length of around 10 ms and an AEEF filter length of around 64 ms works well when the AEEF operates on signals sampled at 16 kHz and the short filters operate on signals sampled at 8 kHz (due to decimation of the signals received by the short filters by the sample rate converter 205). In this example, the short filters have 80 coefficients and operate over 80 samples, and the AEEF has 1024 coefficients and operates over 1024 samples. In terms of the lengths of time over which the respective filters operate, the length of the short filters is approximately 15% of the length of the AEEF. In another example, expressed in terms of the lengths of time over which the respective filters operate, the length of one or both of the secondary adaptive filters is less than half the length of the primary adaptive filter. In another example, expressed in terms of the lengths of time over which the respective filters operate, the length of one or both of the secondary adaptive filters is less than a quarter the length of the primary adaptive filter. In another example, expressed in terms of the lengths of time over which the respective filters operate, the length of one or both of the secondary adaptive filters is less than a fifth of the length of the primary adaptive filter. In another example, expressed in terms of the lengths of time over which the respective filters operate, the length of one or both of the secondary adaptive filters is approximately 15% of the length of the primary adaptive filter.

Use of Decision Parameters at the Controller

The decision parameters generated at the steady state parameter generator 208 and short filters 207 of the controller are used in the decision logic 209 of the controller to control activation of the acoustic echo suppressor 203. The decision logic 209 is shown in more detail in FIG. 3. The decision logic includes convergence detection logic 301 which is configured to identify whether the AEEF has converged and hence identify whether the transient or steady state decision paths are to be followed. Transient state decision logic 302 is used by the controller when the AEEF is not converged. Steady state decision logic 303 is invoked when the AEEF is converged.

Figure 5:
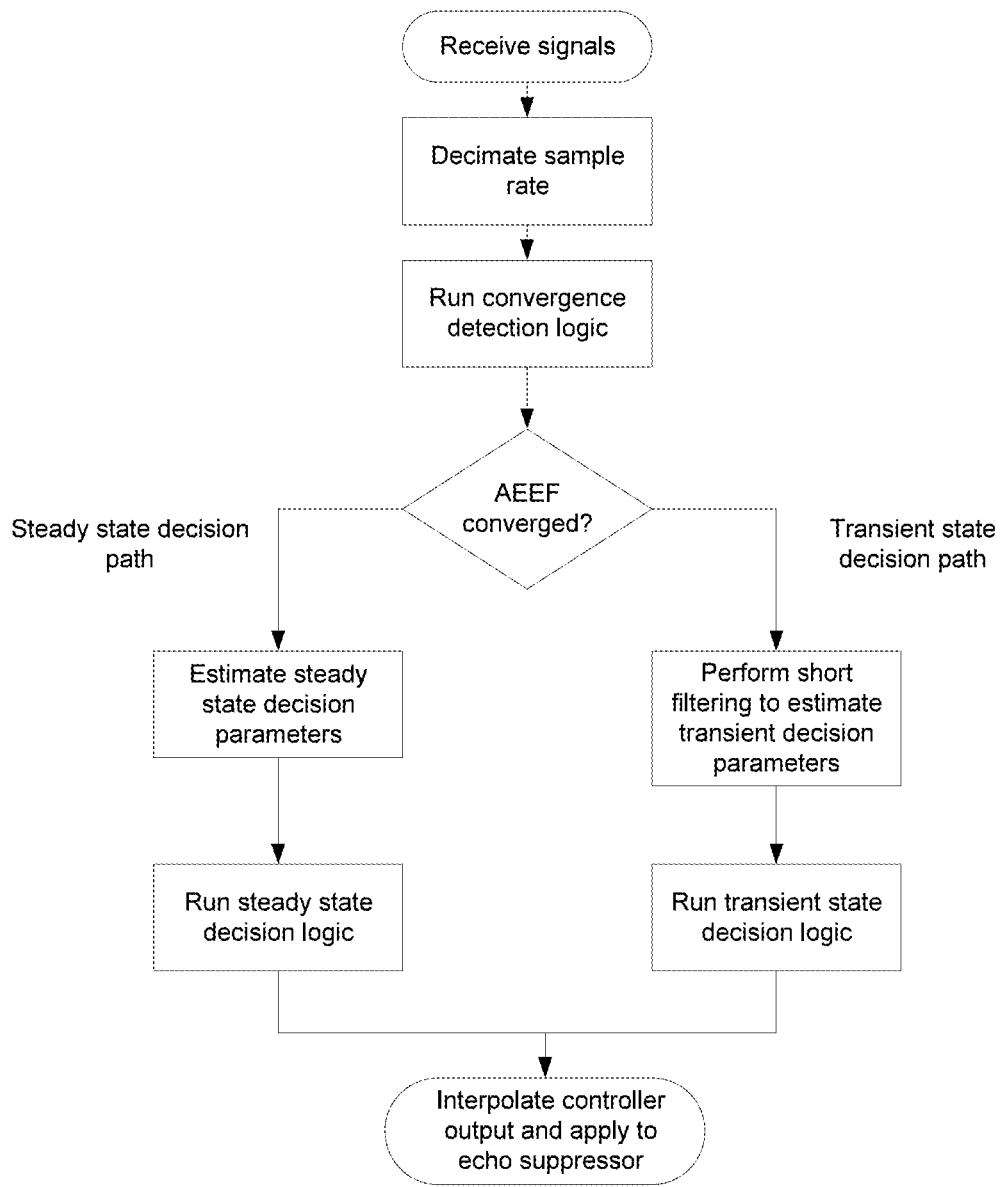
FIG. 5 is a flowchart illustrating the general operation of the controller.

An overview of the operation of the controller 202 according to the present example is shown in FIG. 5 and will now be described. The controller receives audio signals d, e, x and ŷ from an acoustic cancellation arrangement comprising an AEEF 201 and to which the controller is coupled. If necessary, the audio signals are decimated at sample rate converter 205. The controller then determines by means of its convergence detection logic whether or not the AEEF is deemed to have converged. If so, the controller performs control of the AES 203 according to its steady state decision path; otherwise, the controller performs control of the AES 203 according to its transient state decision path.

The steady state decision path involves the controller running its steady state decision logic using steady state decision parameters estimated by the steady state parameter generator 208. The transient state decision path involves the controller running its transient decision logic using transient decision parameters estimated by the short filters 207. In FIG. 5, the estimation of the steady state and transient parameters is shown as forming part of the steady state and transient state decision paths, respectively. This is not an indication of when the decision parameters are in fact estimated. For example, short filters 207 and steady state parameter generator 208 could continuously form and update their respective decision parameters irrespective of the decision path adopted by the controller. Thus, the controller need not wait for identification as to whether the AEEF has converged in order to perform estimation of the decision parameters.

Once the selected decision path has been performed by the controller and an—output decision is generated, the output of the controller is, if necessary, interpolated by the controller so as to convert the sample rate of the controller output to match the sample rate at which the AES operates. The controller output is then provided to the AES so as to cause the AES to perform echo suppression in accordance with the output control signal from the controller. In this manner, the controller can activate and deactivate the AES in dependence on the state of the microphone signal and the convergence state of the AEEF.

Convergence Detection

Various methods can be used to determine whether the AEEF 201 has converged. In the present example, convergence detection logic 301 is used to determine when the AEEF can be said to have converged to a required level on the basis of a set of counters and predefined conditions. In other examples, convergence could be judged by a unit external to the controller—for example, at the AEEF itself—with the controller being arranged to receive a signal indicating the convergence state of the AEEF and accordingly select one of the transient and steady state decision paths.

In the present example, convergence detection logic 301 utilizes six counters and plurality of predefined conditions for convergence detection stability. The operation of the convergence detection logic is illustrated by the algorithm shown in FIG. 6. It will be appreciated that the convergence detection logic could be configured to operate in accordance with other algorithms and other counters or predefined conditions than are used in FIG. 6. The six counters and their use at the convergence logic will now be described.

The first counter is startup indicator counter, strt_cnt, which is used as an indicator of initial session timing until the AEEF is converged. In other words, this counter represents a measure of the number of samples processed by the controller before convergence of the AEEF can be considered to have been achieved. To avoid overflow, this counter's maximum value is typically limited to the length of the register being used to store the counter.

A second counter is recent noise frame counter noise_cnt, which is a measure of the number of frames substantially comprising only noise since the most recent frame comprising near-end speech. The counter is incremented for every noise frame encountered and reset to zero for every speech frame encountered. For example, if the current frame being processed is a speech frame then this counter will be zero, and if the current frame being processed is the kth noise frame after a group of one or more speech frames, this counter will be k.

Adaptation counter conv_cnt represents a measure of the number of samples in respect of which the controller has activated the AES when the AEEF is not expected to have reached a predefined minimum convergence (i.e. prior to steady and stable convergence of the AEEF). The adaptation counter is used to take decisions at the start of convergence of the AEEF.

Suppressor activated counter sp_cnt represents a measure of the number of samples in respect of which the controller has activated the AES in total, irrespective of convergence of AEEF.

History counter hist_cnt is a consistency check useful for stable and steady minimum convergence detection and is used to update conv_cnt accordingly. Hist_cnt is updated if $\zeta_{HS_3}$ is less than a predefined threshold $T_3$. conv_cnt is updated with hist_cnt only when hist_cnt indicates continuous minimum convergence for number of predefined samples.

Initial estimation counter init_cnt is a measure of the number of samples for which the AEEF has achieved more than the predefined minimum and stable convergence during its adaptation.

The history and initial estimation counters are used for robust estimation of convergence confirmation.

Figure 6:
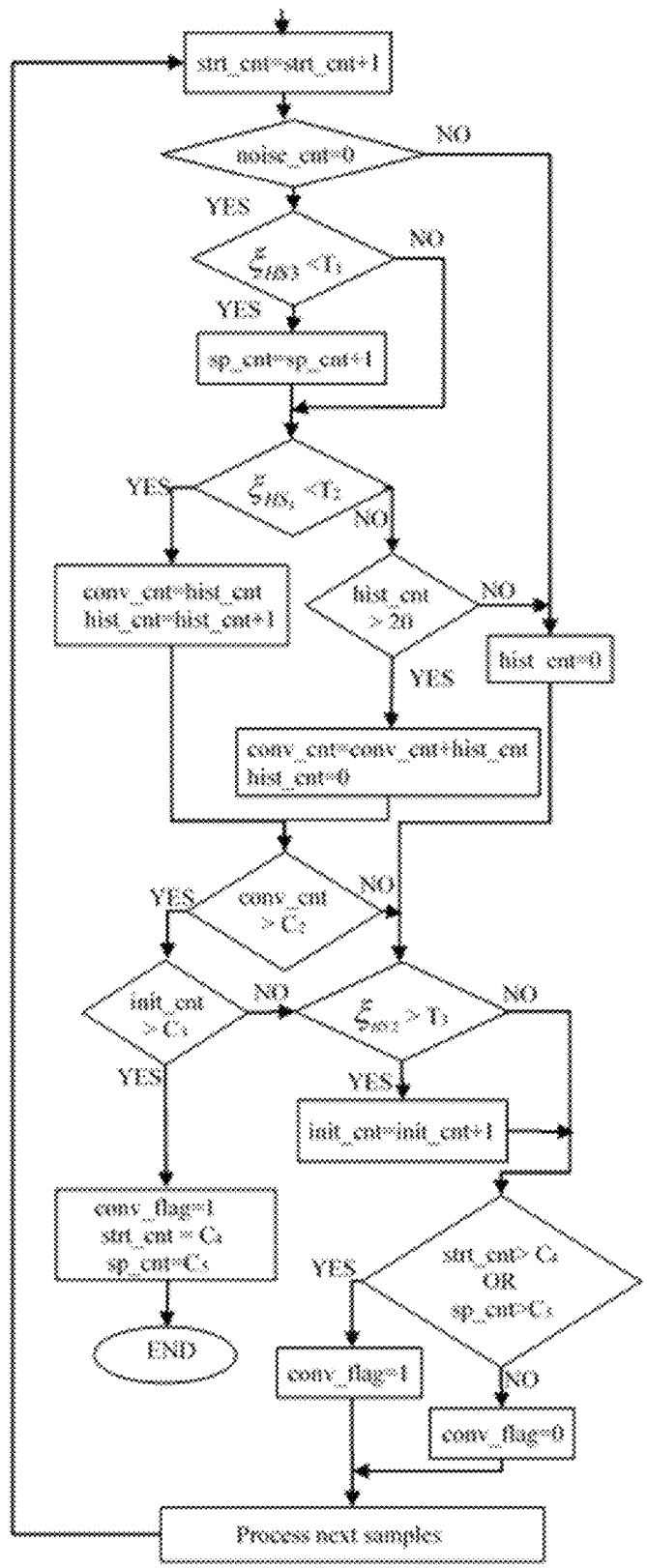
FIG. 6 is a flowchart illustrating an exemplary algorithm performed by convergence detection logic of the controller.
Figure 7:
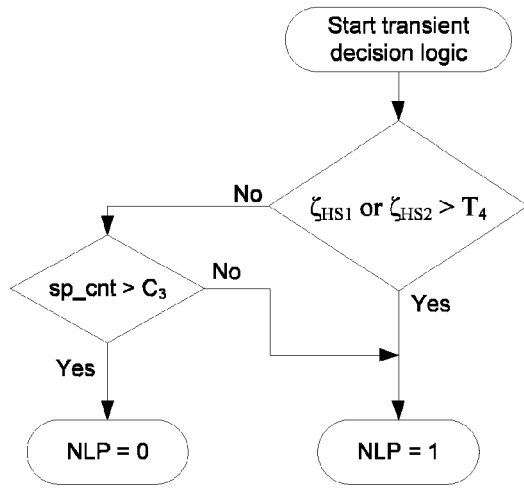
FIG. 7 is a flowchart illustrating an exemplary algorithm performed by transient decision logic of the controller.
Figure 8:
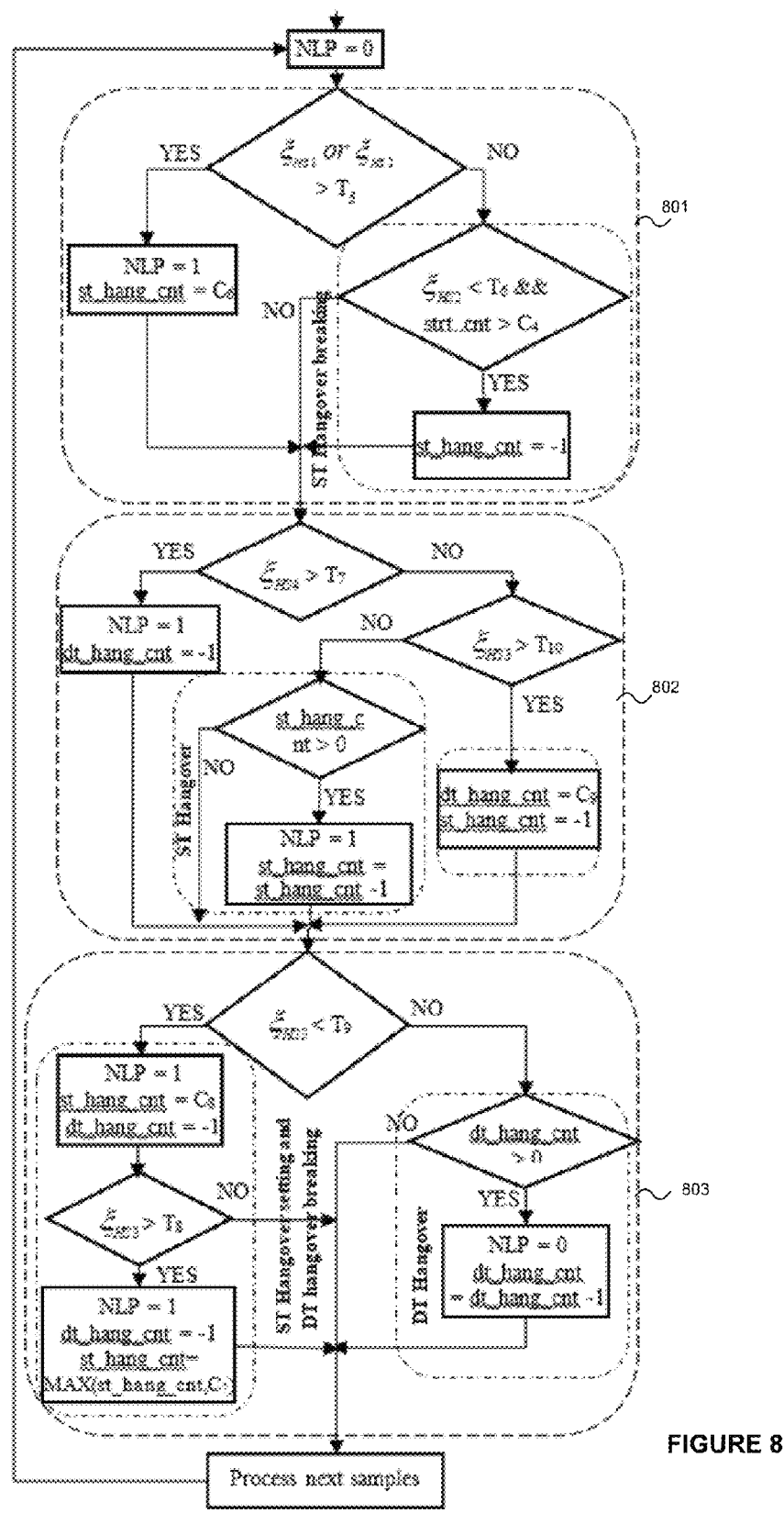
FIG. 8 is a flowchart illustrating an exemplary algorithm performed by steady state decision logic of the controller.

The algorithm performed by the convergence detection logic in the present example is illustrated in FIG. 6. This particular algorithm makes use of the second and third steady state decision parameters, but this need not be the case and other algorithms are possible for determining an indication as to whether the AEEF has converged that do not make use of any decision parameters. The convergence detection algorithm shown in FIG. 6 demonstrates excellent performance with the predefined constants $C_1$ to $C_5$ and thresholds $T_1$ to $T_3$. Example values of these thresholds and constants along with other thresholds used in the transient and steady state decision logic referred to in FIGS. 6, 7 and 8 are shown in Table 1 below.

TABLE 1

| Thresholds | Value | Constants | Value |
|---|---|---|---|
| $T_1$ | 0.46 | $C_1$ | 20 |
| $T_2$ | 0.05 | $C_2$ | 1400 |
| $T_3$ | 0.2 | $C_3$ | 3000 |
| $T_4$ | 0.2 | $C_4$ | 64000 |
| $T_5$ | 0.5 | $C_5$ | 32000 |
| $T_6$ | −0.5 | $C_6$ | 100 |
| $T_7$ | 1.5 | $C_7$ | 540 |
| $T_8$ | 0.2 | $C_8$ | 4000 |
| $T_9$ | 0.01 | $C_9$ | 540 |
| $T_{10}$ | 0.2 | | |

Convergence detection logic 301 is used to identify whether the AEEF has reached a steady and stable convergence state. Based on this decision, either the steady state decision logic or transient state decision logic is used to generate the decision at the controller as to whether or not to activate the echo suppressor. The output of the convergence detector logic is the value conv_flag which identifies whether the AEEF is deemed to be in a converged state: in this example if conv_flag=1 the AEEF is converged, and if conv_flag=0 the AEEF is not converged. The controller then runs either its transient or steady state decision logic in dependence on whether the AEEF is deemed to have converged to the required level.

Convergence decision conv_flag is set to 1 when both the counters init_cnt and conv_cnt are greater than predefined constants $C_3$ and $C_2$ respectively. If minimum convergence is not achieved within a predetermined number of samples represented by the strt_cnt counter or the sp_cnt counter (which are independent of AEEF convergence), the conv_flag is forced to 1. This helps to maximise the duplex characteristics of the system at which the controller is supported and is especially important for systems in which echo cancellation due to the AEEF never exceeds the minimum cancellation expected to activate conv_flag. This can be due to various platform issues such as high non-linearity, frequent flat delay changes, etc. To achieve this, conv_flag is set 1 whenever either of the strt_cnt or sp_cnt are greater than predefined constants $C_4$ and $C_5$ respectively even though the AEEF has not in fact reached its steady state.

It will be apparent that the particular thresholds and constants used at the convergence detection logic depends on the particular characteristics of the system at which the controller is supported and of the audio signals on which the controller and AEEF operate. Any other algorithm suitable for identifying whether or not the AEEF has converged can be used in place of the exemplary algorithm described herein.

Transient State Decision Logic

The transient state decision logic 302 is performed when the AEEF is deemed not to have converged and operates based on the transient decision parameters determined by the secondary filters 207. An exemplary algorithm performed by the transient state decision logic is shown in FIG. 7 and will now be described. It will be apparent that that there are many other suitable algorithms for reaching similar decisions when the AEEF is in its transient state (i.e. has not converged).

Firstly, the first and second transient decision parameters are compared to predefined threshold $T_4$. If either of the transient decision parameters are greater than predefined threshold $T_4$, the NLP decision is set to ON (i.e. 1) and the controller activates the AES. If sp_cnt is lesser than $C_3$ samples, the NLP decision is set to ON and the controller activates the AES. In this scenario, there may be minor voice clipping but this is likely to occur only rarely as the AEEF would typically require only around 500 ms to reach reasonable convergence. This can be useful to suppress artifacts in the error signal during initial convergence of the AEEF. If neither of the transient decision parameters are greater than predefined threshold $T_4$ and sp_cnt is greater than $C_3$ samples, the NLP decision is set to OFF (i.e. 0) and the controller does not activate the AES or prevents the AES from activating, as appropriate to the mechanism of control between the controller and AES.

Steady State Decision Logic

The steady state decision logic 303 is performed when the AEEF is deemed to have converged and operates based on the steady state decision parameters determined by the steady state parameter generator 208. An exemplary algorithm performed by the steady state decision logic is shown in FIG. 8 and will now be described. It will be apparent that that there are many other suitable algorithms for reaching similar decisions when the AEEF is in its steady state (i.e. has converged).

The algorithm performed by the steady state decision logic in the present example makes use of two counters: a single talk "hangover" counter st_hang_cnt and a double talk "hangover" counter dt_hang_cnt, as well as a plurality of predefined thresholds for which exemplary values are provided in Table 1 above. These counters are used to maintain (i.e. "hangover") the decision of the controller for a number of samples indicated by the respective counter following the steady state decision logic identifying single talk (ST) or double talk (DT). This helps to avoid frequent fluctuations in the NLP decision of the controller and thereby the associated distortion.

Three types of operations are possible with the hangover counters:
1) Setting st_hang_cnt or dt_hang_cnt to a predefined value (one of constants $C_6$, $C_8$ and $C_9$ depending on the point in the algorithm shown in FIG. 8). When echo alone is identified the ST hangover is set. When near-end speech alone is identified the DT hangover is set.

This is advantageous because, once echo alone or near-end speech alone is detected, it is natural for them to persist for some finite duration.

2) Decrementing the counter (provided it has a value greater than 0) by 1 and forcing the decision to ST or DT based on the new value of the counter. At no point in time will both counters have a value greater than 0.

3) Breaking the counter by resetting its value to −1. When the steady state decision logic identifies near-end speech during ST, st_hang_cnt is reset. When the transient state decision logic identifies the termination of near-end speech during DT, dt_hang_cnt is reset. This avoids near-end breaks.

It will be apparent that the particular constants and thresholds used will depend on the particular implementation of the steady state decision logic.

The algorithm comprises three stages that make use of the steady state decision parameters, including coarse decision making 801, level I decision confirmation 802 and level II decision confirmation 803. Coarse decision making makes use of $\zeta_{HS_1}$ & $\zeta_{HS_2}$ and also breaks the ST hangover counter. Level I decision confirmation makes use of $\zeta_{HS_3}$ and $\zeta_{HS_4}$, sets DT hangover and applies ST hangover. Level II decision confirmation makes use of $\zeta_{HS_3}$, sets ST hangover and applies DT hangover. Roughly speaking, the coarse decision making stage is sufficient to confirm the presence of far-end speech alone (i.e. single talk, ST). The level I and II decision confirmation stages handle decision making during double talk (DT) when near-end speech is also present, and also perform hangover handling in the manner described above. These stages will now be described in more detail.

1) Coarse Decision Making

If either one of $\zeta_{HS_1}$ and $\zeta_{HS_2}$ is greater than predefined threshold $T_5$, the NLP decision is set to ON and st_hang_cnt is set to a predefined value $C_6$. If both $\zeta_{HS_1}$ and $\zeta_{HS_2}$ are lesser than or equal to predefined threshold $T_5$, the NLP decision set to OFF and, if $\zeta_{HS_2}$ is less than predefined threshold $T_6$ and startup counter strt_cnt is greater than predefined value $C_4$, ST hangover is broken by setting st_hang_cnt to −1.

2) Level I Decision Confirmation

If is greater than predefined threshold $T_7$, the NLP decision is reset to ON and DT hangover is broken by setting dt_hang_cnt to −1. Otherwise, (a) if $\zeta_{HS_3}$ is less than predefined threshold $T_8$ and ST hang over count greater than 0, the NLP decision is reset to ON and ST hang over count is decremented by 1; (b) if $\zeta_{HS_3}$ is not less than predefined threshold $T_8$, DT hang over count is reset to predefined value $C_7$ and ST hang over count is reset to −1.

3) Level II Decision Confirmation

If $\zeta_{HS_3}$ is less than predefined threshold $T_9$, the NLP decision is reset to ON, DT hang over count is reset to −1 and ST hang over count is set to pre-defined value $C_8$. On the failure of the above condition then, based on a comparison of $\zeta_{HS_3}$ with predefined threshold $T_{10}$, one of the following actions is taken:

(a) if $\zeta_{HS_3}$ is greater than predefined threshold $T_{10}$ and DT hang over count is greater than 0, DT hang over count is decremented by 1 and NLP decision is set to OFF;

(b) otherwise, the NLP decision is set to ON, DT hang over count is reset to −1 and ST hang over count is set to predefined value $C_9$ if it is lower than that.

Figure 9C:
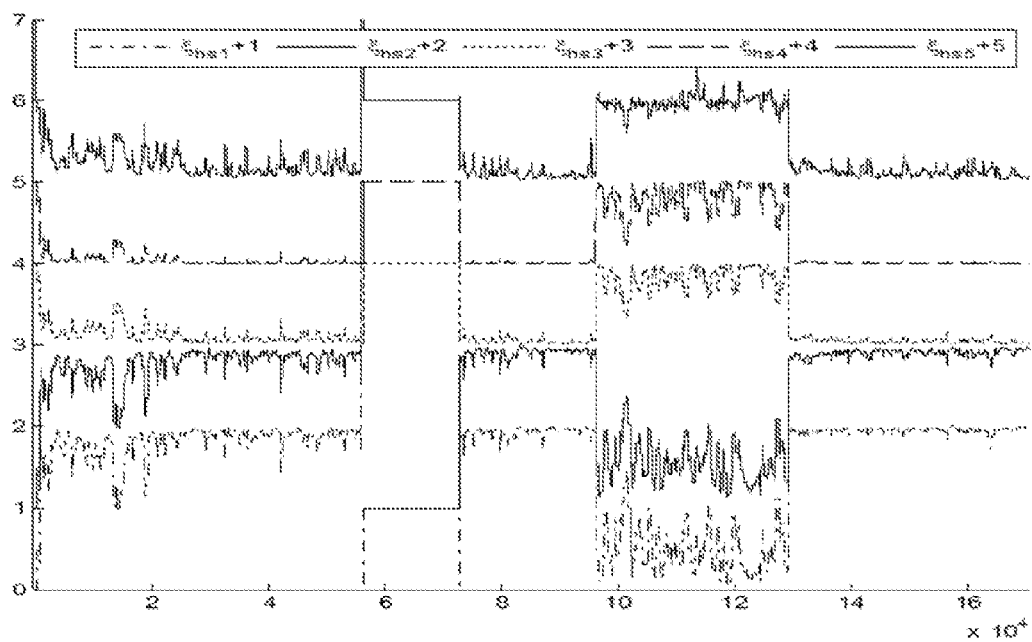
FIG. 9A illustrates microphone and error signals, FIG. 9B the resulting variation in transient decision parameters, and FIG. 9C the resulting variation in steady state decision parameters.
Figure 9A:
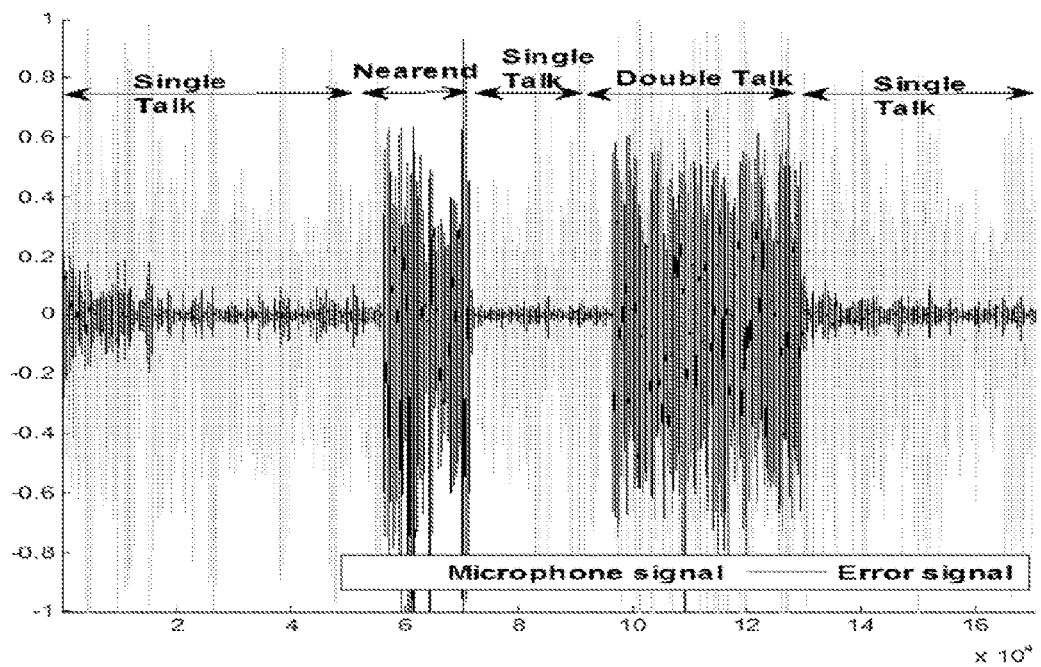
Figure 9B:
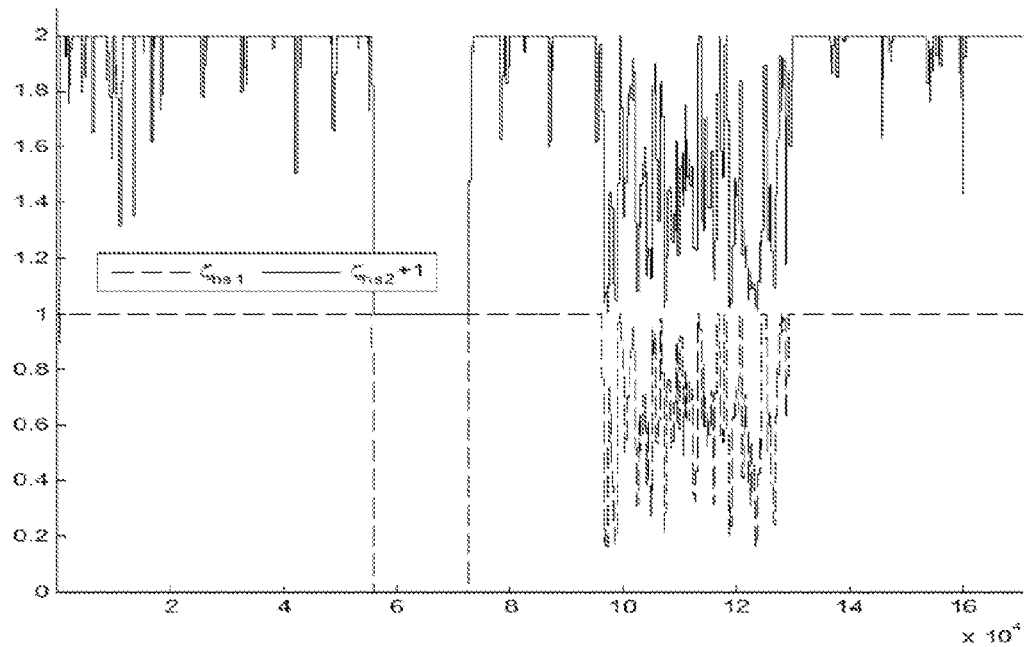

The role of the steps in the algorithms shown in FIGS. 7 and 8 can be more clearly understood by considering the values of the decision parameters when the microphone signal is in different states. FIG. 9 illustrates the variation of microphone and error signals over a sequence of samples and the consequent changes in the decision parameters determined in respect of that signal.

The variation of microphone and error signals in response to a test signal is shown in FIG. 9(*a*). Between samples 56500 and 72500 the test signal comprises near-end speech alone, and between samples 96000 and 125000 the test signal comprises both far-end and near-end speech (i.e. double talk). In other regions of the signal, far-end speech only (single talk) is—present.

The corresponding transient decision parameters for the same range of samples are shown in FIG. 9(*b*). Both $\zeta_{HS_1}$ and $\zeta_{HS_2}$ have the value zero during near-end speech alone and they vary between 0.2 and 1 during double talk regions. Their value is near to 1 during single talk regions.

The corresponding steady state decision parameters for the same range of samples are shown in FIG. 9(*c*). The decision parameters $\zeta_{HS_1}$ and $\zeta_{HS_2}$ have the value close to 1 during single talk regions, they have value between 0 and −1 during double talk regions and −1 during near-end speech alone regions. The decision parameters $\zeta_{HS_3}$, $\zeta_{HS_4}$ and $\zeta_{HS_5}$ have value 1 during near-end speech alone, close to 0 during single talk regions and they have value between 0.2 and 1 during double talk regions.

Performance of an Exemplary System

Systems configured in accordance with the teaching herein provide very low near-end attenuation during double talk regions. For example, the near-end signal attenuation observed is negligible during normal operating conditions and is within 6 dB under very low echo to near-end (ENR) signal ratios. Furthermore, the system provides very quick detection of the onset of near-end and double talk regions. This performance is substantially independent of ENR.

The performance of a system configured in accordance with FIG. 2 and comprising a controller having logic configured in accordance with the exemplary algorithms described herein is illustrated in FIGS. 10 to 14. The system was provided with test signals comprising speech, Composite Source Signal (CSS) signals and echo signals generated according to the ITU-T G.167/G.168 impulse responses. FIGS. 10 to 14 illustrate ensemble averages of the test results.

Figure 10:
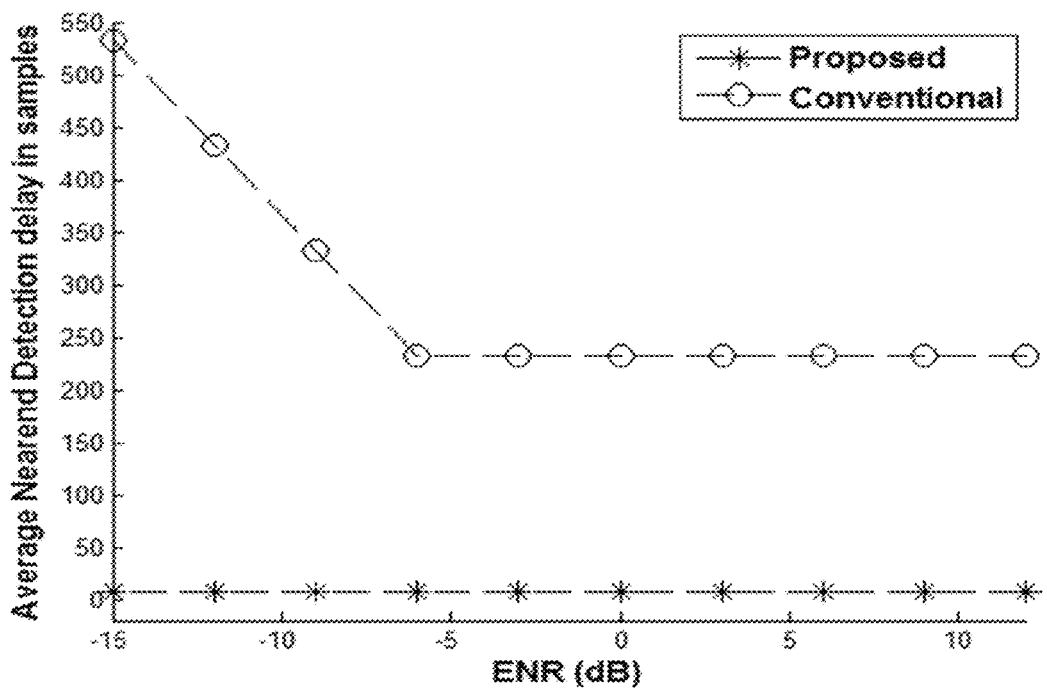
FIG. 10 illustrates near-end speech detection delay in a system comprising the controller and in a conventional system.

FIG. 10 demonstrates a comparison of the time required for near-end speech detection between the present system and the conventional method described in WO 2012/158163 "NON-LINEAR POST-PROCESSING FOR ACOUSTIC ECHO CANCELLATION" discussed above. It can be seen from the figure that the system of FIG. 2 takes about 7 samples to detect near-end speech across the full range of echo to near-end (ENR) signal ratios, whereas the conventional method takes about 233 samples for detection of onset of near-end alone region above around −5 dB ENR, and significantly more than 233 samples at lower ENR values. The AES controller 202 is very robust and doesn't provide any spurious detection under low ENR. In contrast, the conventional method suffers from increasing near-end detection delay with decreasing ENR.

Figure 12:
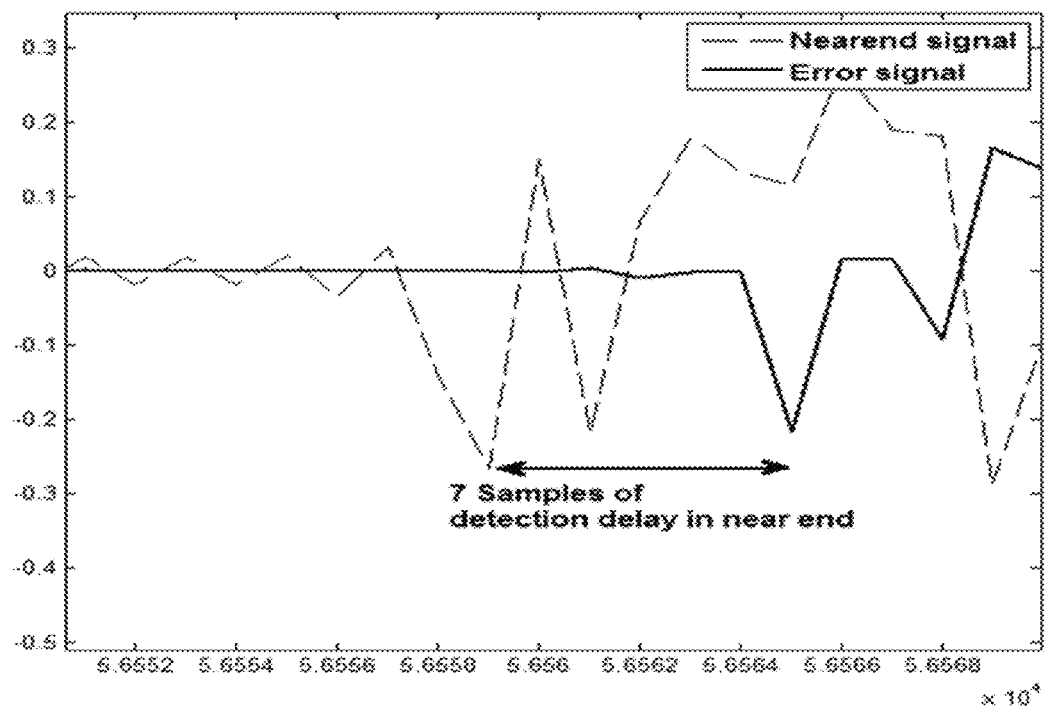
FIG. 12 illustrates near-end speech detection delay in a system comprising the controller at an ENR of 0 dB.

FIG. 12 illustrates the time required for the present system to detect near-end speech at 0 dB ENR. The figure shows—a typical delay of around 7 samples from the point at which near-end speech can be observed in the near-end and error signals.

Figure 11:
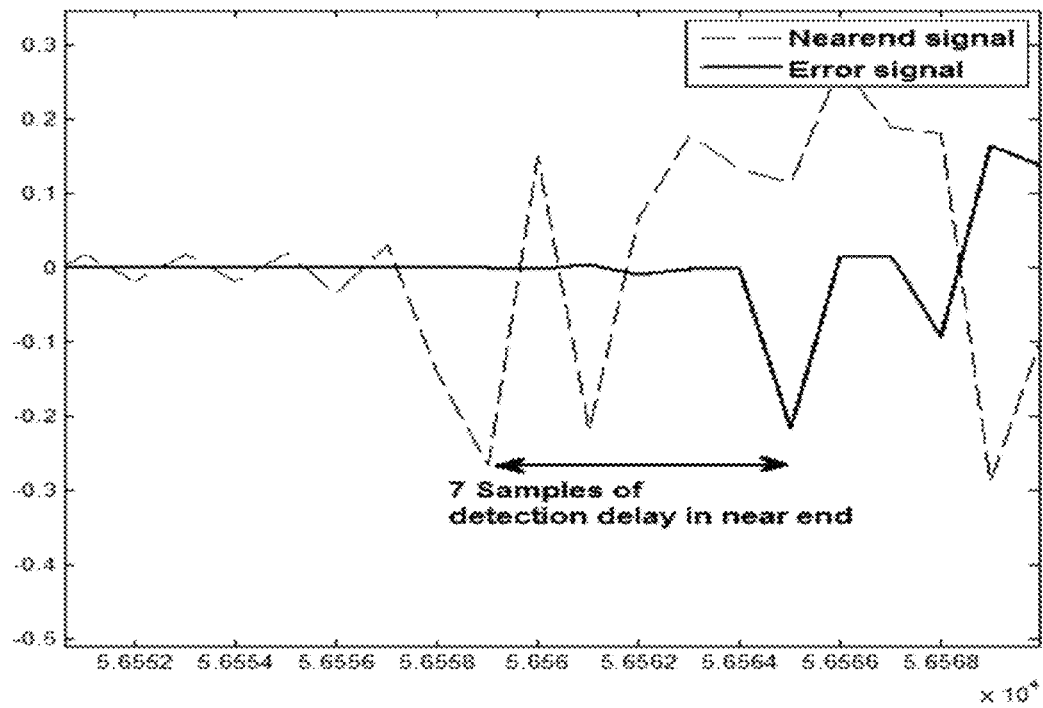
FIG. 11 illustrates double talk detection delay in a system comprising the controller and in a conventional system.
Figure 13:
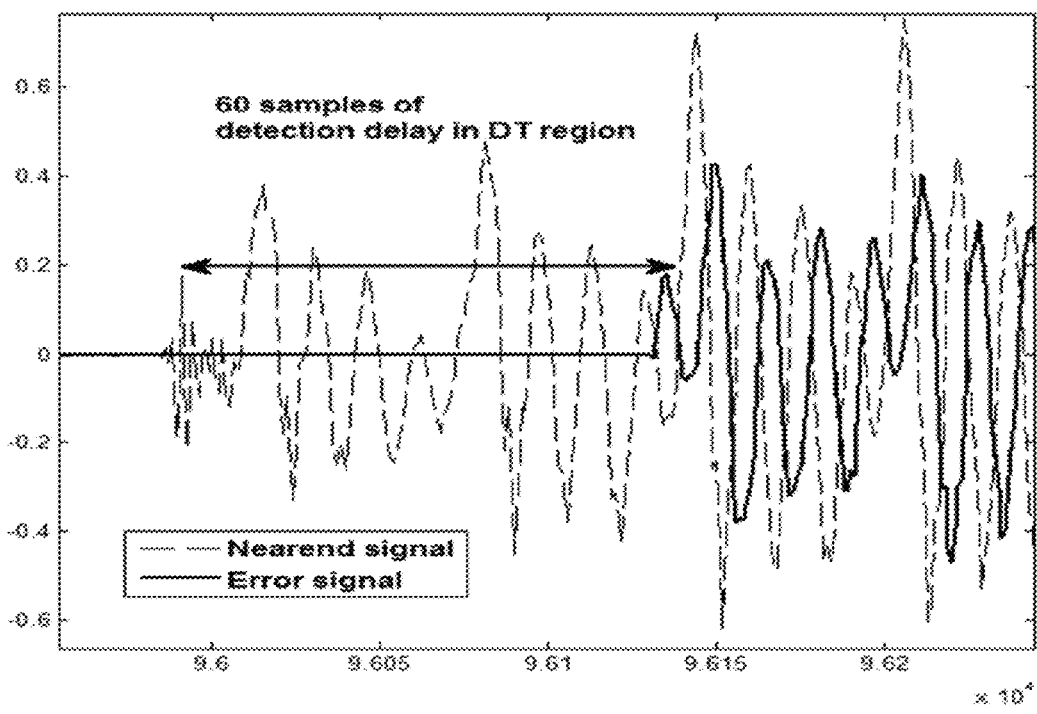
FIG. 13 illustrates double talk detection delay in a system comprising the controller at an ENR of 0 dB.

FIG. 11 provides a comparison of double talk detection delay between the present system and the conventional method. It can be observed that the present system has a 60 sample delay in detecting the onset of double talk whereas the conventional method suffers from a 560 sample delay at 0 dB ENR, which increases with decreasing ENR. FIG. 13 illustrates the time required for the present system to detect double talk at 0 dB ENR. The figures show the typical delay of around 60 samples from the point at which double talk can be observed in the near-end and error signals.

Figure 14:
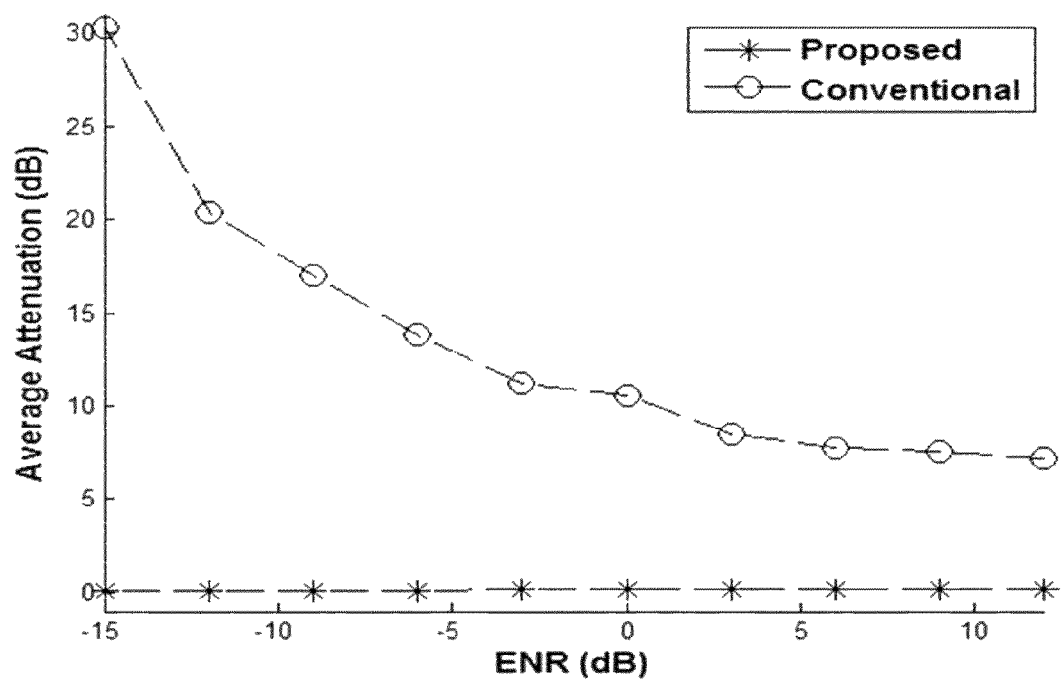
FIG. 14 illustrates near-end signal attenuation during double talk for a system comprising the controller and for a conventional system.

FIG. 14 shows the near-end signal attenuation during double talk of the present system and a system configured in accordance with the conventional method. It can be observed that the present system has minimum attenuation of 0.1 dB even under low ENR cases. In contrast, the conventional method attenuates near-end signal heavily under low ENR cases and achieves a minimum attenuation of only 6 dB at 10 dB ENR. Higher attenuation of the near-end signal during double talk regions leads to voice breaks or clipping. This figure therefore illustrates the excellent full duplex performance of the present system in comparison to the conventional method across the full range of ENR, and especially under low ENR conditions.

Figure 3:
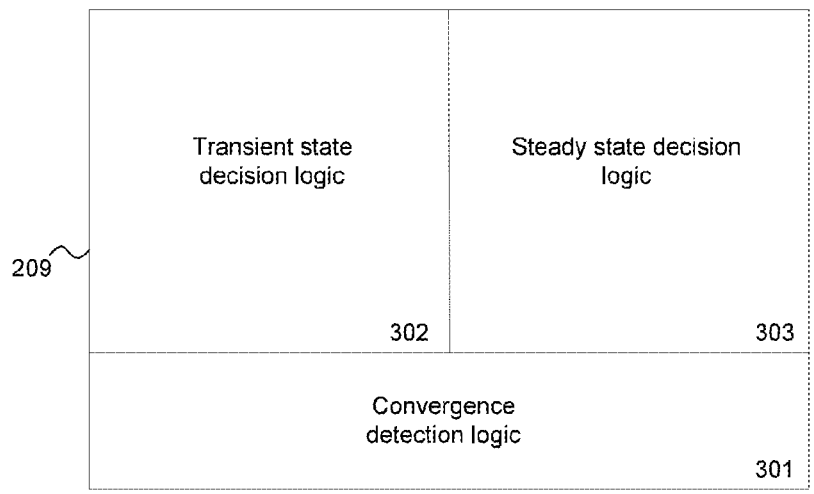
FIG. 3 is a schematic diagram of decision logic of the controller.
Figure 4:
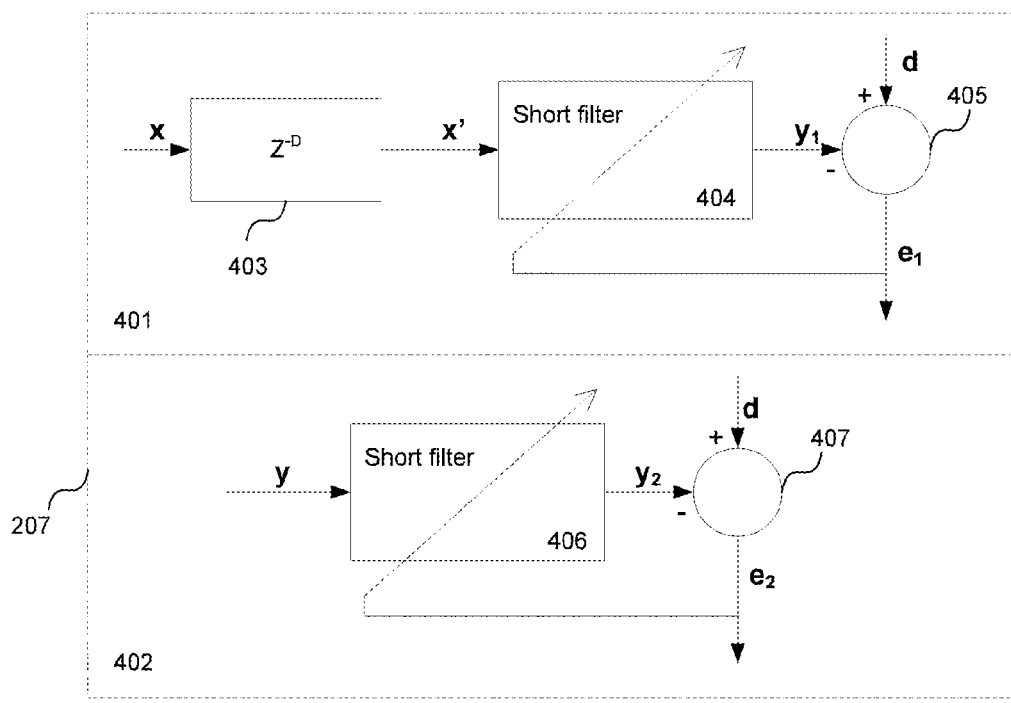
FIG. 4 is a schematic diagram of short filters of the controller.

The controller of FIG. 2 and its aspects as in FIGS. 3 and 4 are shown as comprising a number of functional blocks. This is for illustrative purposes only and is not intended to define a strict division between different parts of hardware on a chip or between different programs, procedures or functions in software. The term logic as used herein can refer to any kind of software, hardware, or combination of hardware and software.

Controllers configured in accordance with the present invention could be embodied in hardware, software or any suitable combination of hardware and software. A controller of the present invention could comprise, for example, software for execution at one or more processors (such as at a CPU and/or GPU), and/or one or more dedicated processors (such as ASICs), and/or one or more programmable processors (such as FPGAs) suitably programmed so as to provide functionalities of the controller, and/or heterogeneous processors comprising one or more dedicated, programmable, and general purpose processing functionalities. In preferred embodiments of the present invention, the controller comprises one or more processors and one or more memories having program code stored thereon, the data processors and the memories being such as to, in combination, provide the claimed controller and/or perform the claimed methods.

The term software as used herein includes executable code for processors (e.g. CPUs and/or GPUs), firmware, bytecode, programming language code such as C or OpenCL, and modules for reconfigurable logic devices such as FPGAs. Machine-readable code includes software and code for defining hardware, such as register transfer level (RTL) code as might be generated in Verilog or VHDL.

Any one or more of the algorithms and methods described herein could be performed by one or more physical processing units executing program code that causes the unit(s) to perform the algorithms/methods. The or each physical processing unit could be any suitable processor, such as a CPU or GPU (or a core thereof), or fixed function or programmable hardware. The program code could be stored in non-transitory form at a machine readable medium such as an integrated circuit memory, or optical or magnetic storage. A machine readable medium might comprise several memories, such as on-chip memories, computer working memories, and non-volatile storage devices.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A controller for an echo suppressor configured to suppress a residual echo of a far-end signal included in a primary error signal, the controller adapted for operation with a primary adaptive filter configured to form a primary echo estimate of the far-end signal included in a microphone signal and with an echo canceller configured to cancel that primary echo estimate from the microphone signal so as to form the primary error signal, the controller comprising:

a coherence estimator configured to form a first measure of coherence between the microphone signal and the primary error signal, and a second measure of coherence between the microphone signal and the primary echo estimate; and control logic configured to, when the primary adaptive filter is in a converged state, combine the first and second measures of coherence so as to form one or more first steady state decision parameters indicative of a state of the microphone signal and, in dependence on said one or more first steady state decision parameters, control activation of the echo suppressor.

2. A controller as claimed in claim 1, the control logic being further configured to cause activation of the echo suppressor when the one or more first steady state decision parameters indicate that near-end speech is not present.

3. A controller as claimed in claim 1, wherein the first measure of coherence is a measure of cross correlation between the microphone signal and the primary error signal, and the second measure of coherence is a measure of cross correlation between the microphone signal and the primary echo estimate.

4. A controller as claimed in claim 1, the control logic being further configured to combine the first and second measures of coherence so as to form a first one of the one or more first steady state decision parameters proportional to a difference between the first and second measures of coherence, said difference being scaled by a measure of the magnitude of the microphone signal.

5. A controller as claimed in claim 1, the control logic being further configured to combine the first and second measures of coherence so as to form a second one of the one or more first steady state decision parameters proportional to a difference between the first and second measures of coherence, said difference being scaled by a sum of the first and second measures of coherence.

6. A controller as claimed in claim 1, the coherence estimator being further configured to form a third measure of coherence of the microphone signal with itself, and the control logic being configured to combine the first and third measures of coherence so as to form a second steady state decision parameter indicative of a state of the microphone signal and to control activation of the echo suppressor further in dependence on the second steady state decision parameter.

7. A controller as claimed in claim 6, the coherence estimator being further configured to form a fourth measure of coherence of the primary error signal with itself, and the control logic being configured to combine the third and fourth measures of coherence so as to form a third steady state decision parameter indicative of a state of the microphone signal and to control activation of the echo suppressor further in dependence on the third steady state decision parameter.

8. A controller as claimed in claim 1, the control logic being further configured to cause activation of the echo suppressor when the second and/or third steady state decision parameters indicate that near-end speech is not present.

9. A method for controlling an echo suppressor configured to suppress a residual echo of a far-end signal included in a primary error signal received from an echo canceller, the echo canceller being configured to cancel a primary echo estimate from a microphone signal so as to form the primary error signal, the primary echo estimate being formed at a primary adaptive filter and representing an estimate of the far-end signal comprised in the microphone signal, the method comprising:

forming a first measure of coherence between the microphone signal and the primary error signal, and a second measure of coherence between the microphone signal and the primary echo estimate;

if the primary adaptive filter is determined to be in a converged state, combining the first and second measures of coherence so as to form one or more first steady state decision parameters indicative of a state of the microphone signal; and controlling activation of the echo suppressor in dependence on the one or more first steady state decision parameters.

10. A controller for an echo suppressor configured to suppress a residual echo of a far-end signal included in a primary error signal, the controller adapted for operation with a primary adaptive filter configured to form a primary echo estimate of the far-end signal included in a microphone signal and with an echo canceller configured to cancel that primary echo estimate from the microphone signal so as to form the primary error signal, the controller comprising:

a secondary adaptive filter configured to form a secondary echo estimate of the far-end signal included in the microphone signal;

a coherence estimator configured to form a first measure of coherence between the microphone signal and the primary error signal, and a second measure of coherence between the microphone signal and the primary echo estimate; and control logic configured to, when the primary adaptive filter is in a non-converged state, combine the microphone signal and the secondary echo estimate so as to form a transient decision parameter indicative of a state of the microphone signal and, in dependence on the transient decision parameter, control activation of the echo suppressor.

11. A controller as claimed in claim 10, wherein the length of the primary adaptive filter being greater than the length of the secondary adaptive filter.

12. A controller as claimed in claim 10, wherein the transient decision parameter is indicative of the presence of echo of the far-end signal in the microphone signal.

13. A controller as claimed in claim 10, the control logic being further configured to cause activation of the echo suppressor when the transient decision parameter indicates that echo of the far-end signal is present in the microphone signal but near-end speech is not present.

14. A controller as claimed in claim 10, the control logic being further configured to combine the microphone signal and the secondary echo estimate such that the transient decision parameter represents a measure of angle between a vector expression of the microphone signal and a vector expression of the secondary echo estimate, said vector expressions each being a sequence of samples of the respective microphone or secondary echo estimate.

15. A controller as claimed in claim 10, the secondary adaptive filter being further configured to form the secondary echo estimate from the far-end signal or the primary echo estimate and being adapted in dependence on a second error signal generated by means of a comparison of its secondary echo estimate and the microphone signal.

16. A controller as claimed in claim 10, the coherence estimator being further configured to form a third measure of coherence of the microphone signal with itself, and the control logic being configured to combine the microphone signal and the secondary echo estimate in dependence on the third measure of coherence.

17. A controller as claimed in claim 16, wherein the third measure of coherence is a measure of autocorrelation or energy of the microphone signal.

18. A controller as claimed in claim 10, the secondary adaptive filter being further configured to operate at a lower sampling rate than the primary adaptive filter.

19. A method for controlling an echo suppressor configured to suppress a residual echo of a far-end signal included in a primary error signal received from an echo canceller, the echo canceller being configured to cancel a primary echo estimate from a microphone signal so as to form the primary error signal, the primary echo estimate being formed at a primary adaptive filter and representing an estimate of the far-end signal comprised in the microphone signal, the method comprising:

at a secondary adaptive filter, forming a secondary echo estimate of the far-end signal comprised in the microphone signal;

forming a first measure of coherence between the microphone signal and the primary error signal, and a second measure of coherence between the microphone signal and the primary echo estimate;

if the primary adaptive filter is determined to be in a non-converged state, combining the microphone signal and the secondary echo estimate so as to form a transient decision parameter indicative of a state of the microphone signal; and controlling activation of the echo suppressor in dependence on the transient decision parameter.

* * * * *